(12) United States Patent
Ko et al.

(10) Patent No.: US 12,138,213 B2
(45) Date of Patent: Nov. 12, 2024

(54) TACTILE STIMULUS PROVIDING APPARATUS

(71) Applicant: BHAPTICS INC., Daejeon (KR)

(72) Inventors: Younghun Ko, Daejeon (KR); Kiuk Gwak, Daejeon (KR)

(73) Assignee: BHAPTICS INC., Daejeon (KR)

( * ) Notice: Subject to any disclaimer, the term of this patent is extended or adjusted under 35 U.S.C. 154(b) by 351 days.

(21) Appl. No.: 16/621,077

(22) PCT Filed: Jun. 12, 2018

(86) PCT No.: PCT/KR2018/006672
§ 371 (c)(1),
(2) Date: Dec. 10, 2019

(87) PCT Pub. No.: WO2018/230949
PCT Pub. Date: Dec. 20, 2018

(65) Prior Publication Data
US 2020/0206074 A1  Jul. 2, 2020

(30) Foreign Application Priority Data
Jun. 13, 2017 (KR) .................. 10-2017-0074417

(51) Int. Cl.
*A61H 23/02* (2006.01)
*A41D 1/00* (2018.01)
(Continued)

(52) U.S. Cl.
CPC ......... *A61H 23/0263* (2013.01); *A41D 1/002* (2013.01); *A41D 1/04* (2013.01);
(Continued)

(58) Field of Classification Search
CPC .............. A61H 23/00–06; A61H 11/00; A61H 2023/002–045; A61H 2201/165;
(Continued)

(56) References Cited

U.S. PATENT DOCUMENTS 661,691 A * 11/1900 Goodwin .................. G09F 3/14
40/6
4,167,850 A 9/1979 Schneider
(Continued)

FOREIGN PATENT DOCUMENTS

EP   3744304 A1   12/2020
JP   S54-109472 A   8/1979
(Continued)

OTHER PUBLICATIONS

Wacker P et al., VibroVision: An On-Body Tactile Image Guide for the Blind, May 7, 2016, pp. 3788-3791, ACM SIGCHI Conference on Human Factors in Computing Systems, San Jose, CA, USA.
(Continued)

*Primary Examiner* — Valerie L Woodward
*Assistant Examiner* — Paige Kathleen Bugg
(74) *Attorney, Agent, or Firm* — IP & T GROUP LLP

(57) ABSTRACT

A tactile stimulation providing apparatus in a form of a vest in accordance with an embodiment of the present invention includes: a first front panel including a plurality of actuators arranged between one side and the other side thereof; a second front panel including a plurality of actuators arranged between one side and the other side thereof, wherein the one side of the second front panel is fastenable to the other side of the first front panel; and a rear panel including a plurality of actuators arranged between one side and the other side thereof, wherein the one side of the rear panel is fastenable to the one side of the first front panel and the other side of the rear panel is fastenable to the other side of the second front panel.

2 Claims, 21 Drawing Sheets

(51) Int. Cl.
  *A41D 1/04* (2006.01)
  *A61H 11/00* (2006.01)
(52) U.S. Cl.
  CPC ........ *A61H 11/00* (2013.01); *A41D 2400/322* (2013.01); *A61H 2201/165* (2013.01)
(58) Field of Classification Search
  CPC .... A41D 1/002; A41D 1/04; A41D 2400/322; G06F 3/00–167
  USPC .......................................................... 601/71
  See application file for complete search history.

(56) References Cited

U.S. PATENT DOCUMENTS

| | | | |
|---|---|---|---|
| 4,638,764 A * | 1/1987 | Anderson | A01K 27/00 119/770 |
| 5,545,125 A * | 8/1996 | Tseng | A61H 23/0263 601/70 |
| 7,050,360 B2 | 5/2006 | Saito | |
| 8,552,847 B1 * | 10/2013 | Hill | B60Q 9/00 340/407.1 |
| 9,857,772 B2 | 1/2018 | Jufer et al. | |
| 9,874,423 B1 * | 1/2018 | Hughes | A41D 13/0012 |
| 10,261,474 B2 | 4/2019 | Han et al. | |
| 10,286,249 B1 * | 5/2019 | Sibhatu | A63B 1/00 |
| D890,837 S * | 7/2020 | Michaud | D16/313 |
| 10,932,504 B1 * | 3/2021 | Gillam | A41D 13/0012 |
| 2005/0132290 A1 | 6/2005 | Buchner et al. | |
| 2005/0277452 A1 * | 12/2005 | Pasamba | H04B 1/385 455/575.6 |
| 2007/0088385 A1 | 4/2007 | Perry | |
| 2007/0166693 A1 | 7/2007 | Blas et al. | |
| 2008/0153590 A1 * | 6/2008 | Ombrellaro | F41J 5/24 463/30 |
| 2010/0268142 A1 | 10/2010 | Nyi | |
| 2013/0065210 A1 * | 3/2013 | Perrine | A47D 13/046 434/255 |
| 2014/0005579 A1 | 1/2014 | Drlik et al. | |
| 2014/0340298 A1 | 11/2014 | Aldossary | |
| 2015/0059070 A1 * | 3/2015 | Boston, Jr. | A61F 13/14 2/463 |
| 2015/0123774 A1 | 5/2015 | Ioffreda et al. | |
| 2015/0145665 A1 | 5/2015 | Hill | |
| 2015/0332659 A1 | 11/2015 | Ebeling et al. | |
| 2016/0058657 A1 * | 3/2016 | Lal | A61H 7/004 601/134 |
| 2016/0135517 A1 * | 5/2016 | Silverberg | A41D 13/005 2/93 |
| 2016/0286940 A1 * | 10/2016 | Thompson | B63B 32/87 |
| 2016/0317383 A1 | 11/2016 | Stanfield et al. | |
| 2016/0317899 A1 * | 11/2016 | Colchie | A41D 13/0518 |
| 2016/0325179 A1 | 11/2016 | Moir et al. | |
| 2017/0116874 A1 * | 4/2017 | Holcomb | G09B 9/003 |
| 2017/0160058 A1 * | 6/2017 | Limpisvasti | A41D 13/0562 |
| 2017/0354530 A1 * | 12/2017 | Shagdar | A41D 31/18 |
| 2018/0049939 A1 * | 2/2018 | Bobey | A61H 23/0218 |
| 2018/0161615 A1 * | 6/2018 | Feng | A63B 21/065 |
| 2018/0228224 A1 * | 8/2018 | Radcliffe | A63B 67/06 |
| 2018/0303702 A1 * | 10/2018 | Novich | A61F 9/08 |
| 2019/0038502 A1 * | 2/2019 | Shockley, Jr. | A61H 23/02 |
| 2019/0204919 A1 | 7/2019 | Gwak et al. | |
| 2019/0286236 A1 | 9/2019 | Gwak et al. | |
| 2020/0124860 A1 | 4/2020 | Gwak et al. | |

FOREIGN PATENT DOCUMENTS

| | | |
|---|---|---|
| JP | H11-226501 A | 8/1999 |
| JP | 2000-237150 A | 9/2000 |
| JP | 2002-350574 A | 12/2002 |
| JP | 2003-334492 A | 11/2003 |
| JP | 2007-267880 A | 10/2007 |
| JP | 2009-520112 A | 5/2009 |
| JP | 2010-512189 A | 4/2010 |
| JP | 2012-110687 A | 6/2012 |
| JP | 2016-123436 A | 7/2016 |
| JP | 2016-206187 A | 12/2016 |
| KR | 10-2009-0088917 | 8/2009 |
| KR | 10-2015-0065071 | 6/2015 |
| KR | 10-1559288 | 10/2015 |
| KR | 10-1603266 B1 | 3/2016 |
| KR | 10-2016-0087323 | 7/2016 |
| KR | 10-2017-0090900 A | 8/2017 |
| KR | 10-2020-0108819 A | 9/2020 |
| WO | 2009/136345 A1 | 11/2009 |
| WO | 2017/164480 | 9/2017 |
| WO | 2018/230790 | 12/2018 |
| WO | 2018/230951 | 12/2018 |

OTHER PUBLICATIONS

Choi S et al., Vibrotactile Display: Perception, Technology, and Applications, Sep. 2013, pp. 2093-2104, vol. 101, No. 9, IEEE.
Extended European Search Report issued by the European Patent Office on Jan. 25, 2021.
Office Action issued by the Japanese Patent Office on Feb. 2, 2021.
Notice of Allowance issued by the Korean Intellectual Property Office on Dec. 3, 2021.
"VR Cover", URL: https://vrcover.com/shop.
Product Catalogue, Customisation Showcase, Model No. 307-103. 002, 9mm Vibration Motor—25mm Type, Precision Microdrives, URL: https://www.precisionmicrodrives.com/product/307-103-002-9mm-vibration-motor-25mm-type.
Materials published on Aug. 24, 2017, bHaptics' TactSuit Promises Better Actuator-Based Haptics at a Lower Price-Point URL: https://www.roadtovr.com/bhaptics-tactsuit-promises-better-actuator-based-haptics-lower-prices/.
Information Materials of Gamescom 2017 including a photo taken at the time and Exhibitor List.
"Surround Haptics and Tactile Brush", URL: http://ndagallery.cooperhewitt.org/gallery/16275499/Surround-Haptics-and-Tactile-Brush.
Plenke, M., "This Young Startup Built a Futuristic Vest That Could Help Deaf People Hear", URL: https://www.mic.com/articles/126656/vest-braille-apparel-kickstarter-helps-deaf-people-hear.
Piateski, E. et al., "Vibrotactile Pattern Recognition on the Arm and Torso", Proceedings of the First Joint Eurohaptics Conference and Symposium on Haptic Interfaces for Virtual Environment and Teleoperator Systems, IEEE, Mar. 2005.
Office Action for application 18817526.9 issued by the European Patent Office on May 2, 2022.
Office Action for the Japanese Patent Application No. 2021-110201 issued by the Japanese Patent Office on Sep. 27, 2022.
Bhaptics: "bHaptics", Dec. 15, 2016, pp. 1-8, XP093157333, Retrieved from the Internet: URL:https://www.youtube.com/watch?v=bDr7lub4nZE [retrieved on Apr. 29, 2024].
Office Action for the Japanese Patent Application No. 2023-082115 issued by the Japanese Patent Office on May 28, 2024.
Extended European Search Report for the European Patent Application No. 24152537.7 issued by the European Patent Office on May 22, 2024.

* cited by examiner

TACTILE STIMULUS PROVIDING APPARATUS

This application is a national stage application of PCT/KR2018/006672 filed on Jun. 12, 2018, which claims priority of Korean patent application number 10-2017-0074417 filed on Jun. 13, 2017. The disclosure of each of the foregoing applications is incorporated herein by reference in its entirety.

TECHNICAL FIELD

The present invention relates to a tactile stimulation providing apparatus.

BACKGROUND ART

A tactile stimulation providing apparatus includes a plurality of actuators, and selectively vibrates the plurality of actuators, thereby providing a tactile stimulation to a user. A coin motor, an eccentric rotation mass (ERM), etc. may be used as the actuator.

The coin motor is small and thin enough to have a diameter of about 10 mm and a thickness of about 3.4 mm, to easily constitute the tactile stimulation providing apparatus. However, the coin motor has a limitation in increasing the intensity of vibration since the size and weight of a vibrator for generating a vibration while actually rotating are limited.

The ERM may be used to generate a vibration stronger than that of the coin motor. In the ERM, a vibration is generated by rotation of an eccentric mass located in a shaft of a vibration motor.

The ERM provides a vibration stronger than that of the coin motor, but a casing capable of ensuring rotation of a vibrator is essential since the vibrator is exposed to the outside.

However, when the existing cylindrical aluminum case is used, there occurs a problem of a decrease in vibration force and an increase in thickness, when the case is coupled to another apparatus (e.g., when the case is sealed in a cloth pocket).

DISCLOSURE

Technical Problem

The present invention is conceived to solve the aforementioned problems. Accordingly, an object of the present invention is to provide a tactile stimulation providing apparatus in which an actuator having an eccentric mass is coupled without attenuation of a vibration force, to provide an efficient tactile stimulation.

Also, another object of the present invention is to provide a tactile stimulation providing apparatus having improved wearing convenience and aesthetic impression while properly transmitting a vibration force of an actuator to a user.

Technical Solution

In accordance with an aspect of the present invention, there is provided a tactile stimulation providing apparatus in a form of a vest, the tactile stimulation providing apparatus including: a first front panel including a plurality of actuators arranged between one side and the other side thereof; a second front panel including a plurality of actuators arranged between one side and the other side thereof, wherein the one side of the second front panel is fastenable to the other side of the first front panel; and a rear panel including a plurality of actuators arranged between one side and the other side thereof, wherein the one side of the rear panel is fastenable to the one side of the first front panel and the other side of the rear panel is fastenable to the other side of the second front panel.

The rear panel may further include a first ring connected to the one side thereof and a second ring connected to the other side thereof. The first front panel may further include a first wing band connected to the one side thereof, and the second front panel may further include a second wing band connected to the other side thereof.

The tactile stimulation providing apparatus may further include: a first detachable member located at one end of a front surface of the first wing band; a second detachable member located on a front surface of the first front panel, the second detachable member being detachable from the first detachable member; a third detachable member located at one end of a front surface of the second wing band; and a fourth detachable member located on a front surface of the second front panel, the fourth detachable member being detachable from the third detachable member.

A width of one end of the first wing band may be greater than that of the inner circumference of the first ring, and a width of one end of the second wing band may be greater than that of the inner circumference of the second ring.

The second detachable member may extend from the front surface of the first front panel to be located on the front surface of the first wing band, and the fourth detachable member may extend from the front surface of the second front panel to be located on the front surface of the second wing band.

The tactile stimulation providing apparatus may further include: a fifth detachable member located at one end of a rear surface of the first wing band, the fifth detachable member being detachable from the second detachable member; and a sixth detachable member located at one end of a rear surface of the second wing band, the sixth detachable member being detachable from the fourth detachable member.

The tactile stimulation providing apparatus may further include: a seventh detachable member located between the fifth detachable member and the other end of the first wing band on the rear surface of the first wing band, the seventh detachable member being detachable from the second detachable member; and an eighth detachable member located between the sixth detachable member and the other end of the second wing band on the rear surface of the second wing band, the eighth detachable member being detachable from the fourth detachable member.

The rear panel may further include a first wing band connected to one side thereof and a second wing band connected to the other side thereof. The first front panel may further include a first ring connected to one side thereof, and the second front panel may further include a second ring connected to the other side thereof.

The first wing band may include a first detachable member located at one end of a rear surface thereof and a second detachable member located between the first detachable member and the other end of the first wing band. The second wing band may include a third detachable member located on a front surface thereof, a fourth detachable member located at one end of a rear surface thereof, and a fifth detachable member located between the fourth detachable member and the other end of the second wing band. The rear panel may include a sixth detachable member located on a rear surface thereof. The fourth detachable member may be detachable from the sixth detachable member, and the first detachable member may be detachable from the third detachable member.

In accordance with another aspect of the present invention, there is provided a tactile stimulation providing apparatus in a form of an arm warmer, the tactile stimulation providing apparatus including: a plurality of actuators; a base band supporting the plurality of actuators, the base band including a first detachable member located on a front surface thereof; an auxiliary band including a second detachable member detachable from the first detachable member on a rear surface thereof, the auxiliary band having one end connected to one end of the base band; and a controller case including a controller for controlling the plurality of actuators therein, the controller case including an opening into which the auxiliary band is inserted.

The tactile stimulation providing apparatus may further include: a ring connected to the one end of the base band; and a third detachable member located at the other end of the front surface of the base band to be spaced apart from the first detachable member, the third detachable member being detachable from the first detachable member.

The tactile stimulation providing apparatus may further include a fourth detachable member located on a front surface of the auxiliary band, the fourth detachable member being detachable from the third detachable member.

A width of the other end of the base band may be greater than that of the inner circumference of the ring.

The tactile stimulation providing apparatus may further include a fifth detachable member located at the other end of a rear surface of the base band, the fifth detachable member being detachable from the first detachable member.

In accordance with still another aspect of the present invention, there is provided a tactile stimulation providing apparatus including: a base band; an actuator located on one surface of the base band, the actuator including a driver and an eccentric mass; a bottom case located on the one surface of the base band, the bottom case including a first accommodation part for accommodating the driver and a second accommodation part for accommodating the eccentric mass; a cover case located on the one surface of the base band, the cover case being coupled to the bottom case to allow the driver to be adhered closely to the first accommodation part; and a top case located on the other surface of the base band, the top case allowing the bottom case to be fixed to the base band.

The tactile stimulation providing apparatus may further include a spacer covering at least a portion of the driver, the spacer being interposed between the driver and the first accommodation part.

The cover case may be coupled to the bottom case to form an extra rotating space of the eccentric mass with the second accommodation part while allowing the eccentric mass to be spaced apart from the one surface of the base band.

Advantageous Effects

In the tactile stimulation providing apparatus in accordance with the present invention, an actuator having an eccentric mass is coupled without attenuation of a vibration force, to provide an efficient tactile stimulation.

Also, the tactile stimulation providing apparatus in accordance with the present invention can have improved wearing convenience and aesthetic impression while properly transmitting a vibration force of an actuator to a user.

MODE FOR THE INVENTION

Figure 1:
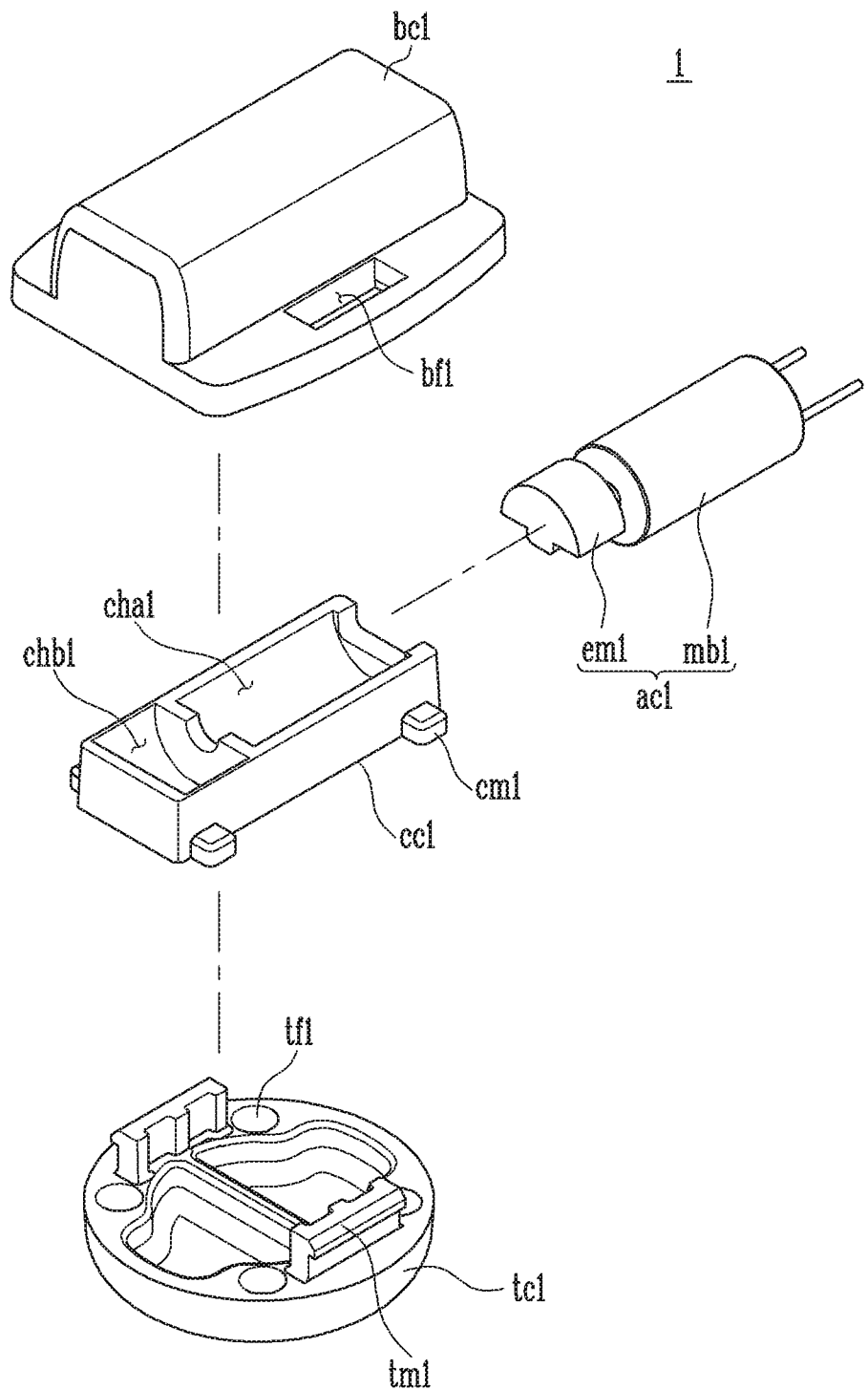
FIG. 1 is a view illustrating an actuator case at a point of view in accordance with an embodiment of the present invention.

Hereinafter, exemplary embodiments are described in detail with reference to the accompanying drawings so that those skilled in the art may easily practice the present invention. The present invention may be implemented in various different forms and is not limited to the exemplary embodiments described in the present specification.

A part irrelevant to the description will be omitted to clearly describe the present invention, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present invention is not limited thereto. Thicknesses of several portions and regions are exaggerated for clear expressions.

Figure 2:
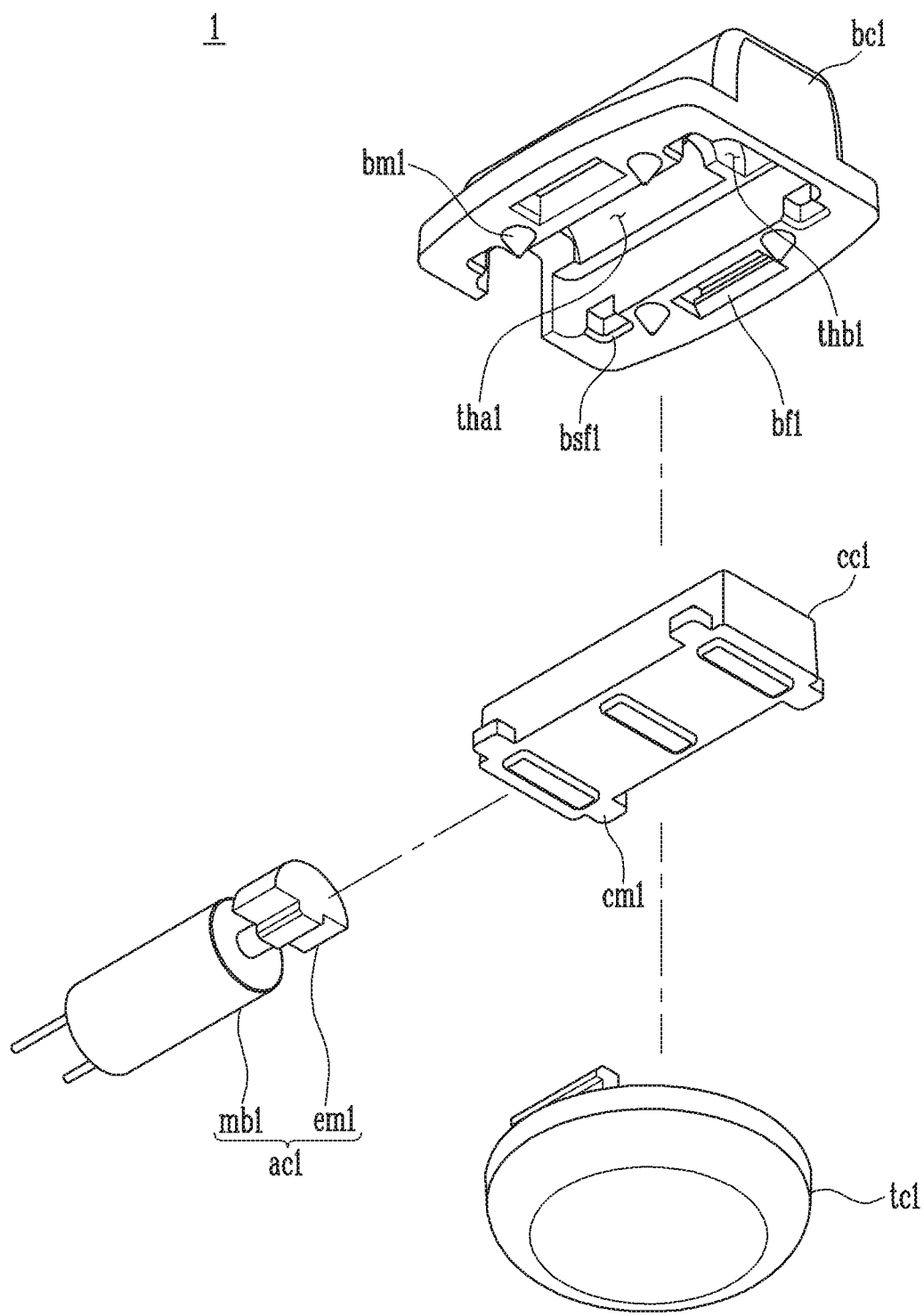
FIG. 2 is a view illustrating the actuator case shown in FIG. 1 at another point of view.

FIG. 1 is a view illustrating an actuator case at a point of view in accordance with an embodiment of the present invention and FIG. 2 is a view illustrating the actuator case shown in FIG. 1 at another point of view.

Referring to FIGS. 1 and 2, the actuator case 1 in accordance with the embodiment of the present invention may include a bottom case bc1, a cover case cc1, and a top case tc1.

A position relationship of the bottom case bc1, the cover case cc1, and the top case tc1 may be determined based on a base band. The base band may be located between the cover case cc1 and the top case tc1. A relative position relationship of the base band and the actuator case 1 will be described with reference to FIGS. 3 and 4.

An actuator ac1 is located on one surface of the base band, and includes a driver mb1 and an eccentric mass em1. The driver mb1 and the eccentric mass em1 may be rotatably connected through a shaft. The actuator ac1 may be an eccentric rotation motor (ERM). The actuator ac1 may generate a vibration when the eccentric mass em1 rotated by the driver mb1 serves as an imbalanced vibrator. The actuator ac1 may be a cylindrical vibration motor that has a diameter of about 6 mm and has a total height of about 17 mm. While a coin-shaped motor generates a vibration in a horizontal direction when a vibrator is rotated horizontally, the actuator ac1 of this embodiment may generate a vibration in a vertical direction.

The bottom case bc1 is located on the one surface of the base band, and includes a first accommodation part tha1 for accommodating the driver mb1 and a second accommodation part thb1 for accommodating the eccentric mass em1. That is, the bottom case bc1 may accommodate the whole or a portion of the actuator ac1 except a line. In some embodiments, when the bottom case bc1 accommodates only a portion of the actuator ac1, the other portion of the actuator ac1 may be accommodated by the cover case cc1 which will be described later.

The cover case cc1 is located on the one surface of the base band, and is coupled to the bottom case bc1 to allow the driver mb1 to be adhered closely to the first accommodation part tha1.

Referring to FIGS. 1 and 2, the cover case cc1 may be coupled to the bottom case bc1 while covering the actuator ac1. A male fastening part cm1 of the cover case cc1 is fitted into a female fastening part bsf1 of the bottom case bc1, so that the cover case cc1 can be firmly fixed to the bottom case bc1. In particular, the first accommodation part tha1 and an accommodation part chaff may be formed such that the driver mb1 of the actuator ac1 can be firmly fixed. The male fastening part cm1 of the cover case cc1 may protrude such that the cover case cc1 is parallel to the surface on which the cover case cc1 is in contact with the base band. In this embodiment, four pairs of the male fastening parts cm1 and the female fastening parts bsf1 are provided. However, in some embodiments, the number of the male fastening parts cm1 and the female fastening parts bsf1 may vary.

The cover case cc1 is coupled to the bottom case bc1, to form, along with the second accommodation part thb1, an extra rotating space of the eccentric mass em1 while allowing the eccentric mass em1 to be spaced apart from the one surface of the base band. That is, an accommodation part chb1 of the cover case cc1 is matched to the second accommodation part thb1, to form an extra rotating space that does not interfere with rotation of the eccentric mass em1. Also, the accommodation part chb1 of the cover case cc1 functions to allow the eccentric mass em1 to be spaced apart from the one surface of the base band. Thus, even when the base band is made of a flexible cloth or rubber material, the eccentric mass em1 can be reliably rotated without colliding with the base band.

The top case tc1 is located on the other surface of the base band, and allows the bottom case bc1 to be fixed to the base band.

A male fastening part tm1 of the top case tc1 penetrates the base band and is coupled to a female fastening part bf1, so that the actuator ac1 and the actuator case 1 can be fixed to the base band. The base band may include an opening having a shape through which the male fastening part tm1 can pass. In some embodiments, an area of the top case tc1 adhered closely to the other surface of the base band may be smaller than that of the bottom case bc1 adhered closely to the one surface of the base band. Since a space in which the male fastening part tm1 can be located is relatively insufficient, two pairs of the male fastening parts tm1 and the female fastening parts bf1 are provided in this embodiment. In accordance with this embodiment, when the area of the top case tc1 is smaller than that of the bottom case bc1, a distance between a plurality of top cases, on which vibrations of a plurality of actuators are concentrated is sufficient even though the plurality of actuators are densely arranged. Hence, a resolution of vibrations that a user actually feels can be increased. Also, in this embodiment, one surface of the top case tc1 is configured in a circular shape, so that the user does not feel any corner, thereby providing more comfortable feeling.

The bottom case bc1 may include a protrusion part bm1, and the top case tc1 may include a recessed part tf1. The protrusion part bm1 of the bottom case bc1 is fitted into the recessed part tf1 while pressurizing the base band, so that the actuator ac1 and the actuator case 1 can be more firmly fixed to the base band. In this embodiment, since the area of the top case tc1 is relatively small, four pairs of the protrusion parts bm1 and the recessed parts tf1 are provided.

Figure 3:
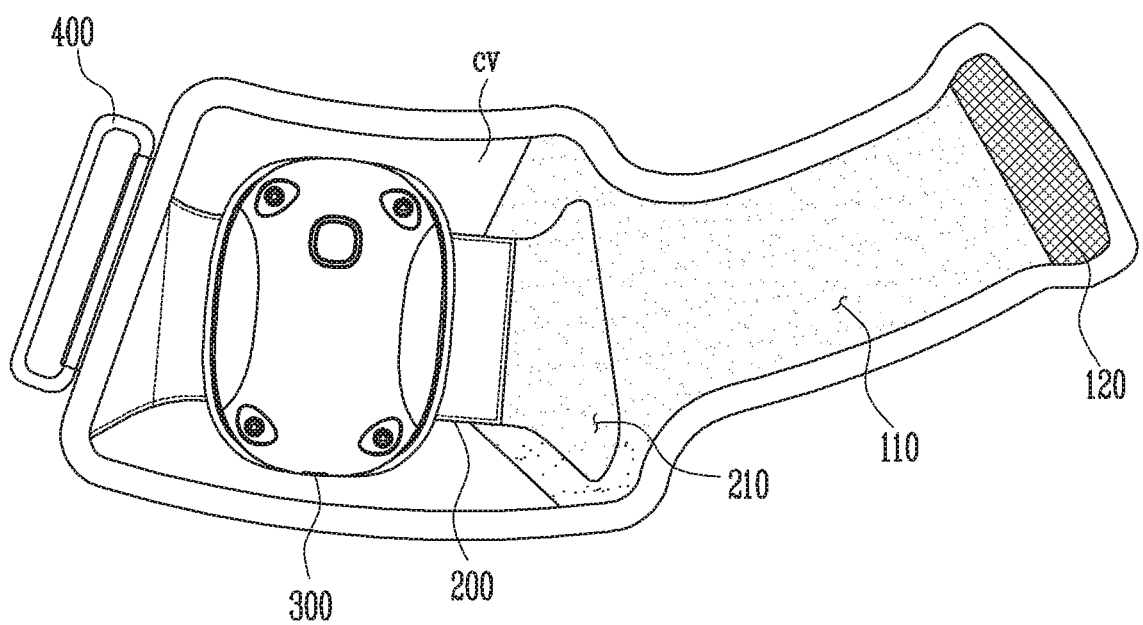
FIG. 3 is a front view of a tactile stimulation providing apparatus formed in the shape of an arm warmer in accordance with an embodiment of the present invention.
Figure 4:
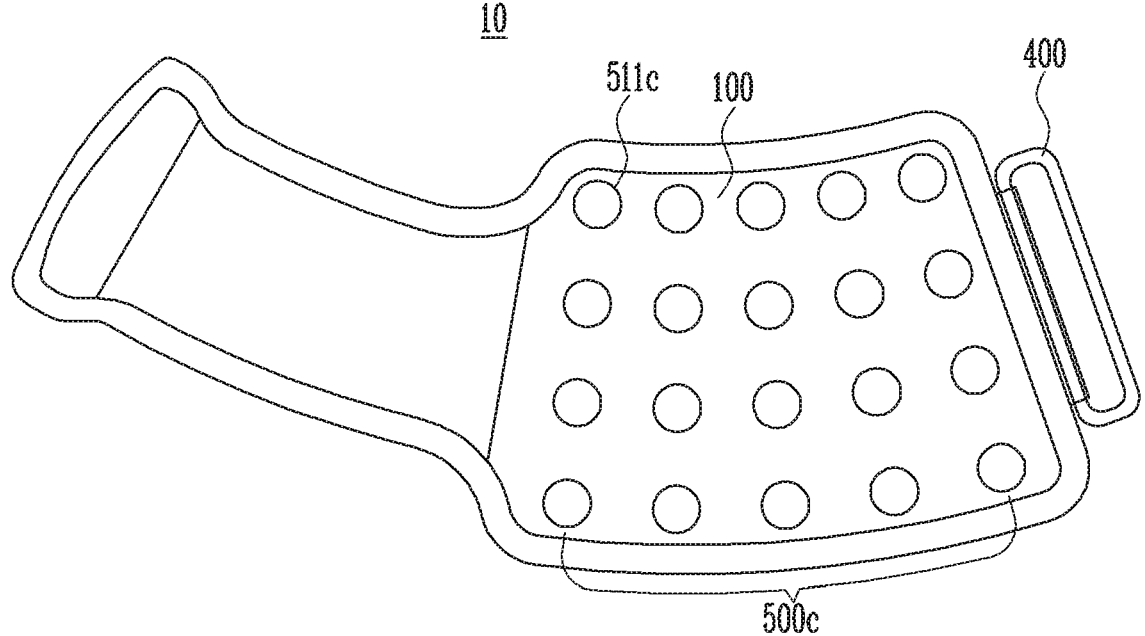
FIG. 4 is a rear view of the tactile stimulation providing apparatus shown in FIG. 3.

FIG. 3 is a front view of a tactile stimulation providing apparatus formed in the shape of an arm warmer in accordance with an embodiment of the present invention and FIG. 4 is a rear view of the tactile stimulation providing apparatus shown in FIG. 3.

Referring to FIGS. 3 and 4, the tactile stimulation providing apparatus 10 formed in the shape of an arm warmer in accordance with the embodiment of the present invention may include a base band 100, a plurality of actuators, a plurality of bottom cases, a plurality of cover cases, and a plurality of top cases 500c. In some embodiments, the tactile stimulation providing apparatus 10 may selectively further include an auxiliary band 200, a controller case 300, a ring 400, a controller, and a signal transmission member.

The plurality of top cases 500c may be located on a rear surface of the base band 100. The plurality of bottom cases and the plurality of cover cases may be located on a front surface of the base band 100. The plurality of bottom cases and the plurality of cover cases may be covered by a protective cover CV and detachable members 110 and 120. Each of the plurality of actuators may be interposed between a corresponding bottom case and a corresponding cover case. Therefore, the base band 100 may support the plurality of actuators.

A flexible material such as a cloth material, a mesh material, a rubber material, or neoprene may be used for the base band 100. Since users have various shapes and sizes with respect to the same body part, comfortable wearing sensation can be provided to the users, when the flexible material is used for the base band 100. The base band 100 may be configured in a single layer. However, in a preferred embodiment, the base band 100 may be configured in a plurality of layers. The plurality of layers may be made of different materials. For example, the rear surface of the base band 100 may be configured in a layer made of a mesh material, and the front surface of the base band 100 may be configured in a layer made of a neoprene material. The plurality of actuators may be located on the rear surface of the base band 100, which is made of the mesh material. The mesh material does not propagate vibrations of the plurality of actuators, and does not interfere with movements of the plurality of actuators. In addition, the front surface of the base band 100, which is made of the neoprene material, can prevent vibrations generated from the plurality of actuators from reaching the controller case 300.

The detachable member 110 may be located on the front surface of the base band 100. In addition, the detachable member 120 may be located at the other end of the front surface of the base band 100 to be spaced apart from the detachable member 110, and be detachable from the detachable member 110.

The detachable member 110 may be a detachable member of type A, and the detachable member 120 may be a detachable member of type B.

In this embodiment, a detachable member may be of any one of the type A and the type B. The type A and the type B may be detachable from each other. However, the type A and the type A may not be detachable from each other. Similarly, the type B and the type B may not be detachable from each other. All kinds of detachable members having these types may be used as the detachable member of this embodiment. Examples of the detachable member may be VELCRO® (a hook and loop fastener), a magnet, an electromagnet, a snap button, buckle, and the like. A case where the detachable member is VELCRO® (a hook and loop fastener) is assumed and illustrated in drawings of the following embodiments.

An upper edge and a lower edge of the base band 100 may have a streamline shape. The unfolded shape of the base band 100 becomes a streamline shape such as a planar figure of a truncated cone, so that the base band 100 can be adhered more closely to an arm of a user when the base band 100 is rolled around the arm of the user.

The auxiliary band 200 may include a detachable member (not shown) of the type B, which is detachable from the detachable member 110 on a rear surface thereof, and one end of the auxiliary band 200 may be connected to one end of the base band 100.

The auxiliary band 200 separates the controller case 300 from the base band 100, so that vibrations of the plurality of actuators located at the base band 100 are not propagated to the controller case 300, thereby preventing noise. Also, the auxiliary band 200 adjusts a relative attachment position of the detachable member on the rear surface thereof and the detachable member 100, so that the position of the controller case 300 can be adjusted to fit a body type of a user.

A detachable member 210 is located on a front surface of the auxiliary band 200, and is detachable from the detachable member 120. The detachable member 210 may be a detachable member of the type A. Thus, when a user wears the tactile stimulation providing apparatus 10, the detachable member 120 is detachable from not only the detachable member 110 but also the detachable member 210, and accordingly, the tactile stimulation providing apparatus 10 can fit various body types of users.

In accordance with an embodiment, a width of the other end of the auxiliary band 200 may be greater than that of the inner circumference of an opening of the controller case 300. For example, the other end of the auxiliary band 200 may have a trumpet shape or hook shape. Thus, the controller case 300 is not easily escaped from the auxiliary band 200.

The ring 400 may be connected to the one end of the base band 100. A width of the other end of the base band 100 may be greater than that of the inner circumference of the ring 400. For example, the other end of the base band 100 may have a trumpet shape or hook shape. In accordance with this embodiment, when a user removes the tactile stimulation providing apparatus 10 from an arm thereof, the other end of the base band 100 is caught by the ring 400, so that the tactile stimulation providing apparatus 10 can be prevented from suddenly falling. Further, the base band 100 maintains a state in which the other end of the base band 100 is caught by the ring 400, so that a process in which a next user again inserts the other end of the base band 100 into the ring 400 when the next user wears the tactile stimulation providing apparatus 10 can be omitted. Since the base band 100 has elasticity, a user enables the other end of the base band 100 to pass through the ring 400 by bending the other end of the base band 100, when the user wears the tactile stimulation providing apparatus 10.

The plurality of top cases 500c may be exposed to the outside. The plurality of top cases 500c exposed to the outside may be adhered closely to an arm of a user. Each of the plurality of top cases 500c propagates a driving force of a corresponding actuator to a body of a user, so that the user can feel a tactile stimulation.

The controller may be located in the controller case 300, and generate a driving signal for controlling the plurality of actuators. The controller may include a microcontroller, a motor driver, a power management module, and the like. A separate battery for driving the controller may be located in the controller case 300. The controller may be configured in the form of a PCB, an FPCB, an IC, etc. Also, the controller may receive a tactile stimulation pattern input through the existing wireless communication techniques including Bluetooth, Wi-Fi, and the like or through the existing wired communication techniques. The tactile stimulation pattern may be a multidirectional tactile stimulation pattern. A separate memory device may be located in the controller case 300.

The signal transmission member may transmit a driving signal to the plurality of actuators from the controller. The signal transmission member may be configured with an FPCB or a material such as a wire. The signal transmission member may electrically connect the plurality of actuators to the controller. Each of the base band 100, the auxiliary band 200, and the controller case 300 may include an opening such that the signal transmission member passes therethrough.

Figure 5:
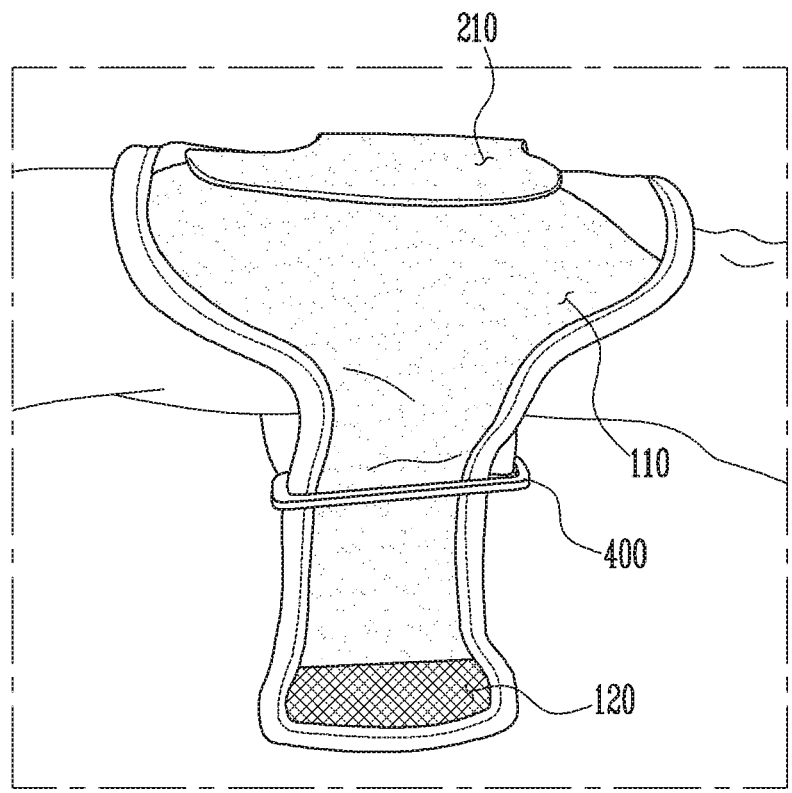
FIG. 5 is a view illustrating a point of view where a user is wearing the tactile stimulation providing apparatus shown in FIG. 3.

FIG. 5 is a view illustrating a point of view where a user is wearing the tactile stimulation providing apparatus shown in FIG. 3.

Referring to FIG. 5, the user is wearing the tactile stimulation providing apparatus 10 on a body thereof. FIG. 5 illustrates in a state in which the tactile stimulation providing apparatus 10 is put on the body of the user, and one end of the tactile stimulation providing apparatus 10, which includes the detachable member 120, passes through the ring 400.

Figure 6:
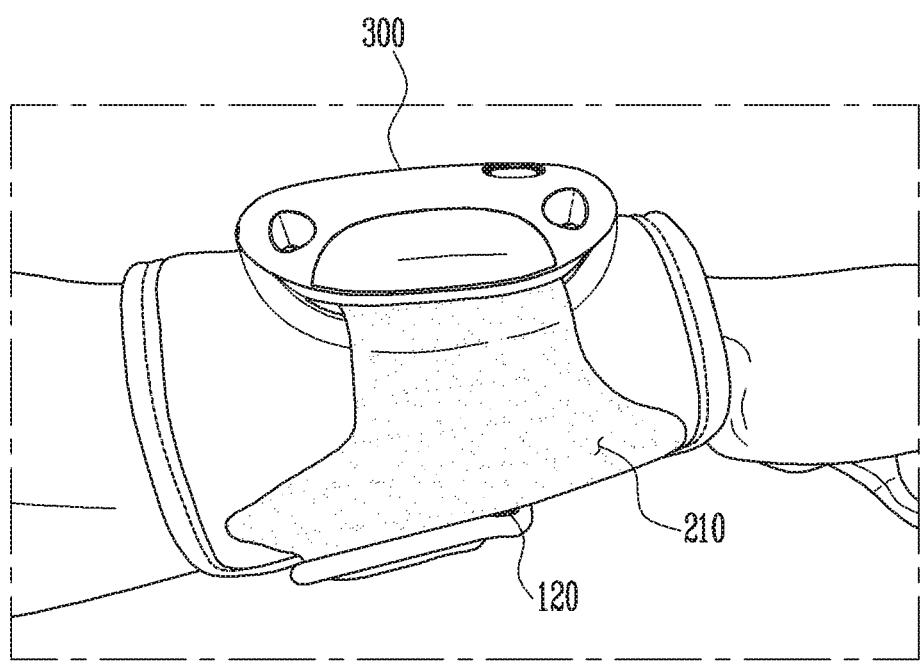
FIG. 6 is a view illustrating a point of view where a user has worn the tactile stimulation providing apparatus shown in FIG. 3.

FIG. 6 is a view illustrating a point of view where a user has worn the tactile stimulation providing apparatus shown in FIG. 3.

Referring to FIG. 6, the user attaches the detachable member 120 of the tactile stimulation providing apparatus 10 to the detachable member 210, so that the tactile stimulation providing apparatus 10 is fixed to a body of the user. When the thickness of a body part of the user, on which the tactile stimulation providing apparatus 10 is worn, is thicker, the detachable member 120 may be attached to the detachable member 110. Thus, the detachable member 120 is attachable to the detachable member 110 or the detachable member 210, to handle various bodies of users.

Figure 7:
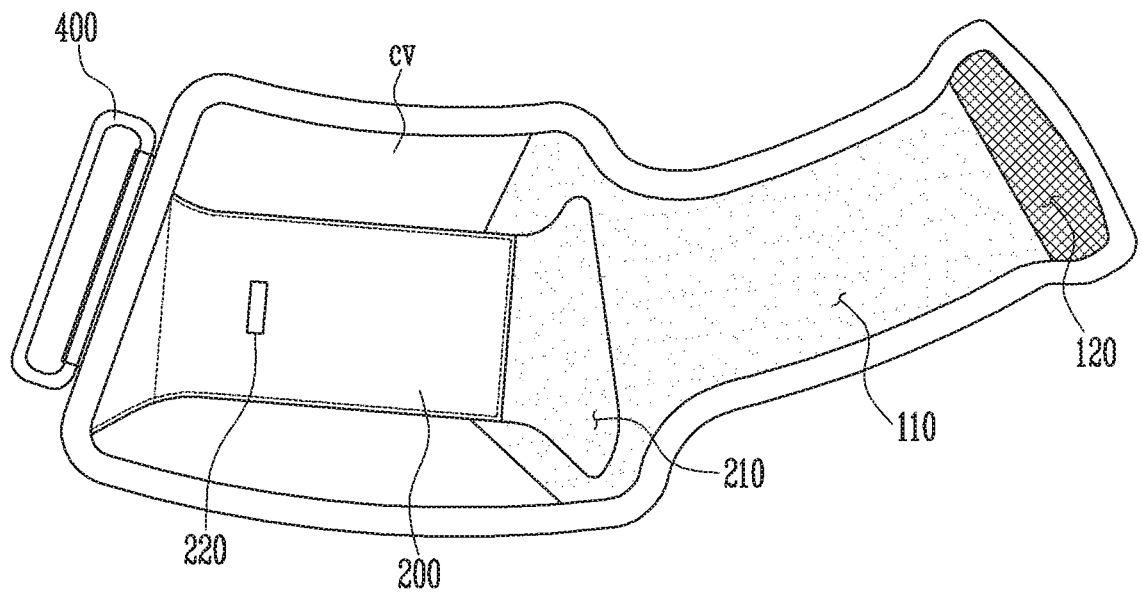
FIG. 7 is a view illustrating a base band and an auxiliary band of the tactile stimulation providing apparatus shown in FIG. 3.

FIG. 7 is a view illustrating the base band and the auxiliary band of the tactile stimulation providing apparatus shown in FIG. 3.

In FIG. 7, a state in which the controller case 300 is removed as compared with FIG. 3 is illustrated.

The auxiliary band 200 may include an opening 220 into which the signal transmission member is inserted. The base band 100 may include an opening into which the signal transmission member is inserted, even though the opening is not shown in FIG. 7 since it is covered by the auxiliary band 200. The openings may have sizes and positions, which are approximately similar to each other.

Figure 8:
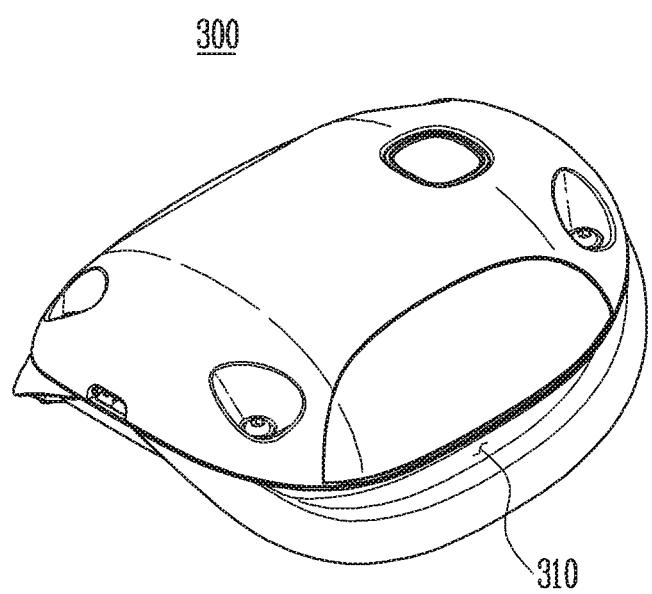
FIG. 8 is a view illustrating a controller case of the tactile stimulation providing apparatus shown in FIG. 3 at a point of view.
Figure 9:
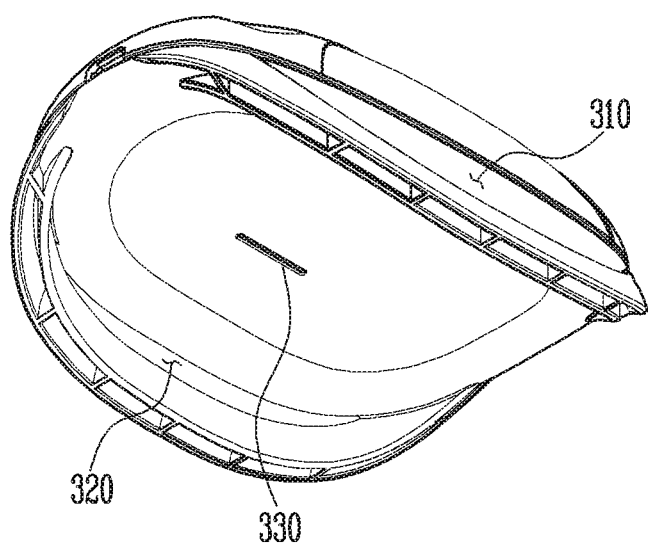
FIG. 9 is a view illustrating the controller case shown in FIG. 8 at another point of view.

FIG. 8 is a view illustrating the controller case of the tactile stimulation providing apparatus shown in FIG. 3 at a point of view and FIG. 9 is a view illustrating the controller case shown in FIG. 8 at another point of view.

Referring to FIGS. 8 and 9, the controller case 300 may include openings 310 and 320 into which the auxiliary band 200 is inserted. Also, the controller case 300 may further include an opening 330 into which the signal transmission member is inserted.

A lower surface of the controller case 300 may be concavely formed to be adhered closely to an arm of a user. That is, the controller case 300 may have a curvature suitable for a curve of a body of the user, which is to be designed.

Figure 10:
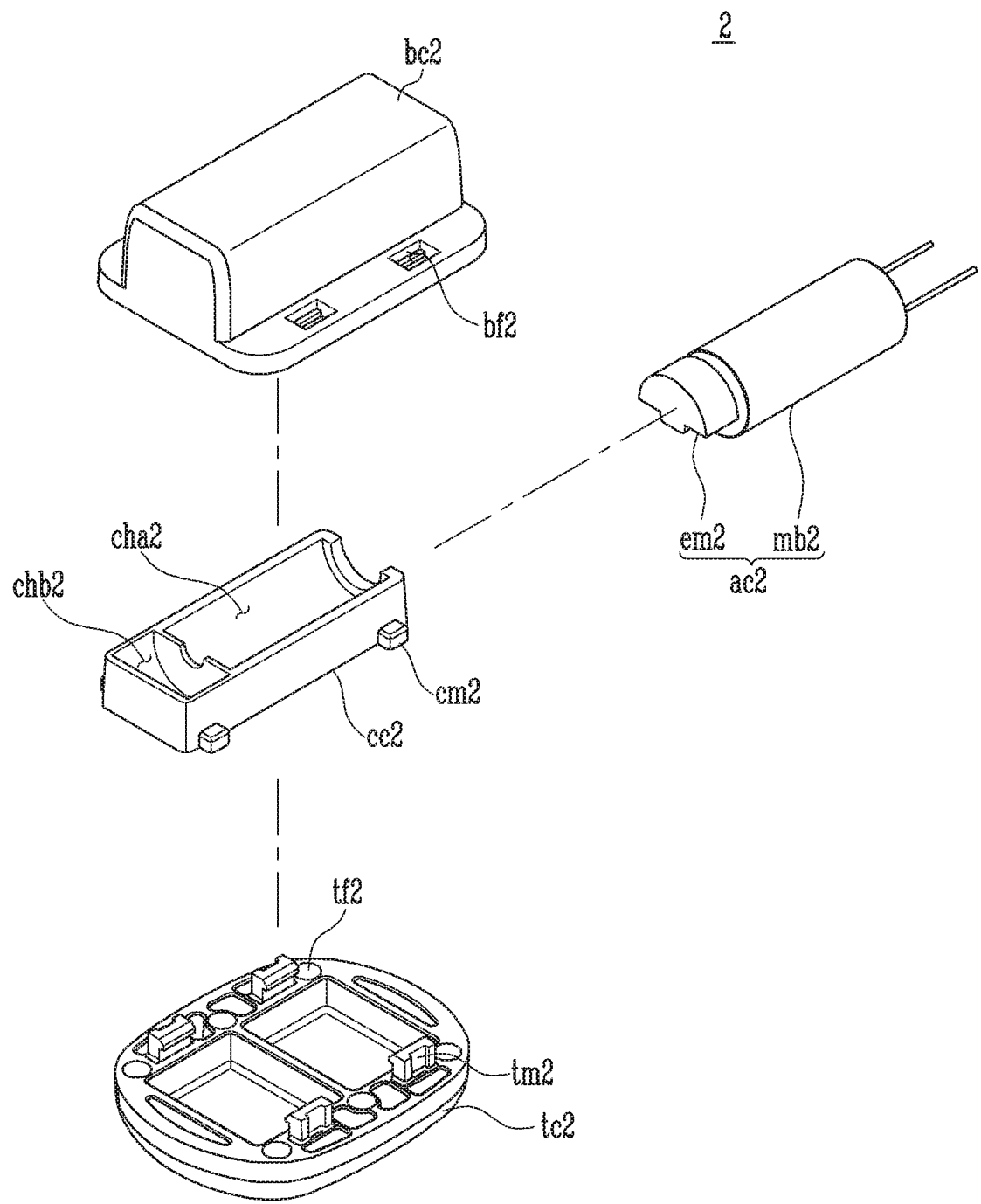
FIG. 10 is a view illustrating an actuator case at a point of view in accordance with another embodiment of the present invention.
Figure 11:
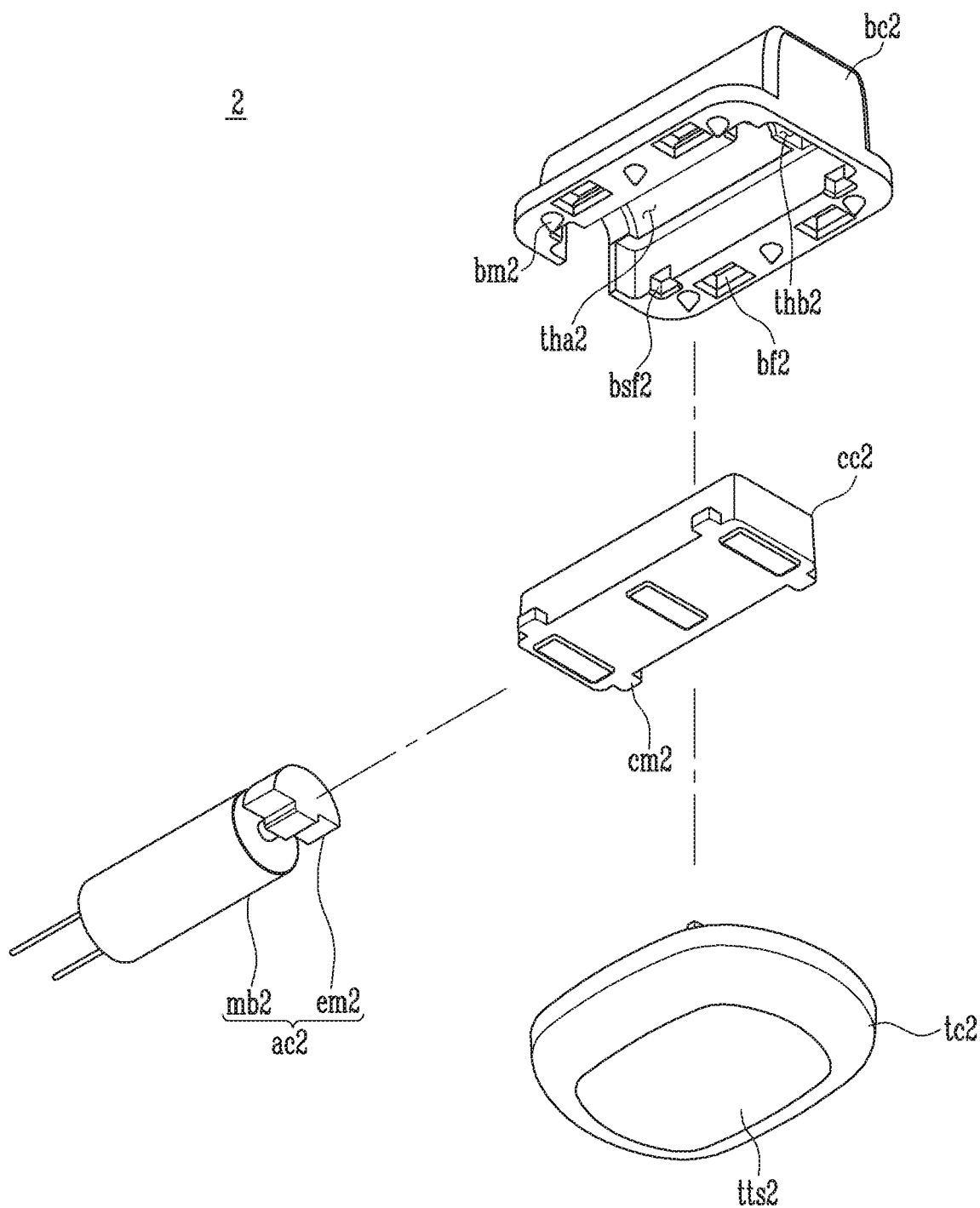
FIG. 11 is a view illustrating the actuator case shown in FIG. 10 at another point of view.

FIG. 10 is a view illustrating an actuator case at a point of view in accordance with another embodiment of the present invention and FIG. 11 is a view illustrating the actuator case shown in FIG. 10 at another point of view.

Referring to FIGS. 10 and 11, the actuator case 2 in accordance with another embodiment of the present invention may include a bottom case bc2, a cover case cc2, and a top case tc2.

A position relationship of the bottom case bc2, the cover case cc2, and the top case tc2 may be determined based on a base band. The base band may be located between the cover case cc2 and the top case tc2. A relative position relationship of the base band and the actuator case 2 will be described with reference to FIGS. 12 to 14.

An actuator ac2 is located on one surface of the base band, and includes a driver mb2 and an eccentric mass em2. The driver mb2 and the eccentric mass em2 may be rotatably connected through a shaft. The actuator ac2 may be an ERM. The actuator ac2 may generate a vibration when the eccentric mass em2 rotated by the driver mb2 serves as an imbalanced vibrator. The actuator ac2 may be a cylindrical vibration motor that has a diameter of about 6 mm and has a total height of about 17 mm. While a coin-shaped motor generates a vibration in a horizontal direction when a vibrator is rotated horizontally, the actuator ac2 of this embodiment may generate a vibration in a vertical direction.

The bottom case bc2 is located on the one surface of the base band, and includes a first accommodation part tha2 for accommodating the driver mb2 and a second accommodation part thb2 for accommodating the eccentric mass em2. That is, the bottom case bc2 may accommodate the whole or a portion of the actuator ac2 except a line. In some embodiments, when the bottom case bc2 accommodates only a portion of the actuator ac2, the other portion of the actuator ac2 may be accommodated by the cover case cc2 which will be described later.

The cover case cc2 is located on the one surface of the base band, and is coupled to the bottom case bc2 to allow the driver mb2 to be adhered closely to the first accommodation part tha2.

Referring to FIGS. 10 and 11, the cover case cc2 may be coupled to the bottom case bc2 while covering the actuator ac2. A male fastening part cm2 of the cover case cc2 is fitted into a female fastening part bsf2 of the bottom case bc2, so that the cover case cc2 can be firmly fixed to the bottom case bc2. In particular, the first accommodation part tha2 and an accommodation part chat may be formed such that the driver mb2 of the actuator ac2 can be firmly fixed. The male fastening part cm2 of the cover case cc2 may protrude such that the cover case cc2 is parallel to the surface on which the cover case cc2 is in contact with the base band. In this embodiment, four pairs of the male fastening parts cm2 and the female fastening parts bsf2 are provided. However, in some embodiments, the number of the male fastening parts cm2 and the female fastening parts bsf2 may vary.

The cover case cc2 is coupled to the bottom case bc2, to form, along with the second accommodation part thb2, an extra rotating space of the eccentric mass em2 while allowing the eccentric mass em2 to be spaced apart from the one surface of the base band. That is, an accommodation part chb2 of the cover case cc2 is matched to the second accommodation part thb2, to form an extra rotating space that does not interfere with rotation of the eccentric mass em2. Also, the accommodation part chb2 of the cover case cc2 functions to allow the eccentric mass em2 to be spaced apart from the one surface of the base band. Thus, even when the base band is made of a flexible cloth or rubber material, the eccentric mass em2 can be reliably rotated without colliding with the base band.

The top case tc2 is located on the other surface of the base band, and allows the bottom case bc2 to be fixed to the base band.

A male fastening part tm2 of the top case tc2 penetrates the base band and is coupled to a female fastening part bf2, so that the actuator ac2 and the actuator case 2 can be fixed to the base band. The base band may include an opening having a shape through which the male fastening part tm2 can pass. In some embodiments, an area of the top case tc2 adhered closely to the other surface of the base band may correspond to that of the bottom case bc2 adhered closely to the one surface of the base band. Since a space in which the male fastening part tm2 can be located is relatively sufficient, four pairs of the male fastening parts tm2 and the female fastening parts bf2 are provided in this embodiment. Thus, although the actuator ac2 is more strongly vibrated, this can be endured. In accordance with this embodiment, the area of the top case tc2 corresponds to that of the bottom case bc2, a sufficient vibration force is propagated to a back of a user, which is relatively less sensitive, so that the user can more surely feel a vibration. Further, in this embodiment, a corner of one surface of the top case tc2 is formed round, so that more comfortable feeling can be provided to the user.

The bottom case bc2 may include a protrusion part bm2, and the top case tc2 may include a recessed part tf2. The protrusion part bm2 of the bottom case bc2 is fitted into the recessed part tf2 while pressurizing the base band, so that the actuator ac2 and the actuator case 2 can be more firmly fixed to the base band. In this embodiment, since the area of the top case tc2 is relatively sufficient, six pairs of the protrusion parts bm2 and the recessed parts tf2 are provided, so that a sufficient supporting force can be provided.

Figure 12:
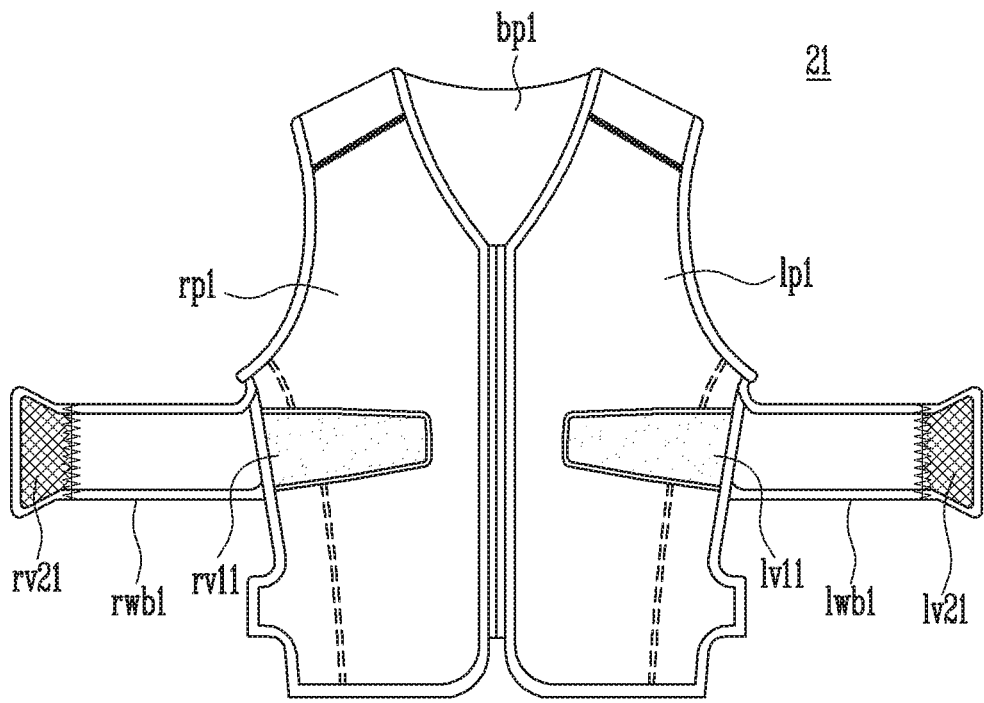
FIG. 12 is a front view of a tactile stimulation providing apparatus formed in the form of a vest in accordance with an embodiment of the present invention.
Figure 13:
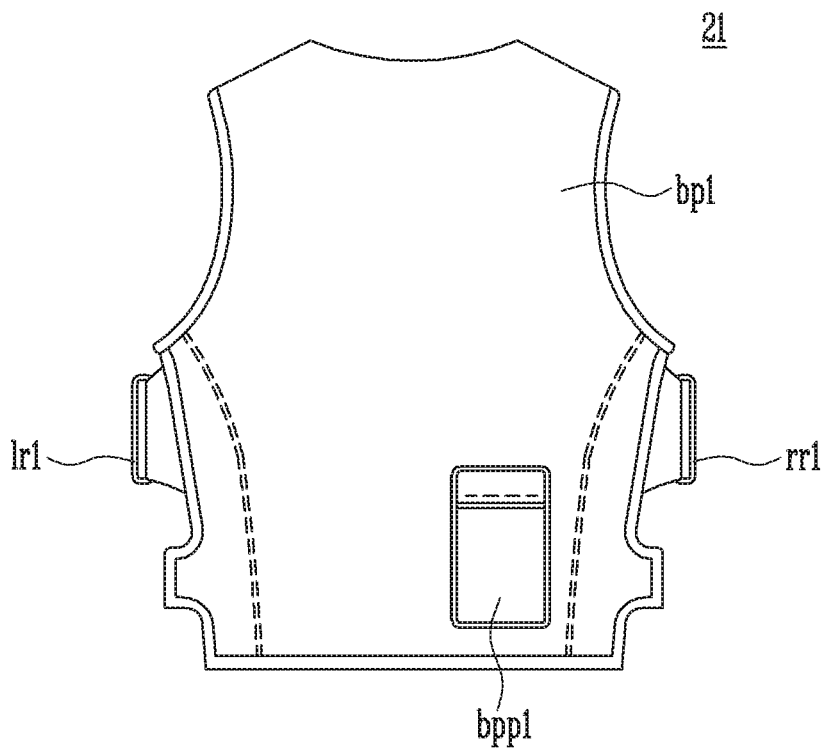
FIG. 13 is a rear view of the tactile stimulation providing apparatus shown in FIG. 12.
Figure 14:
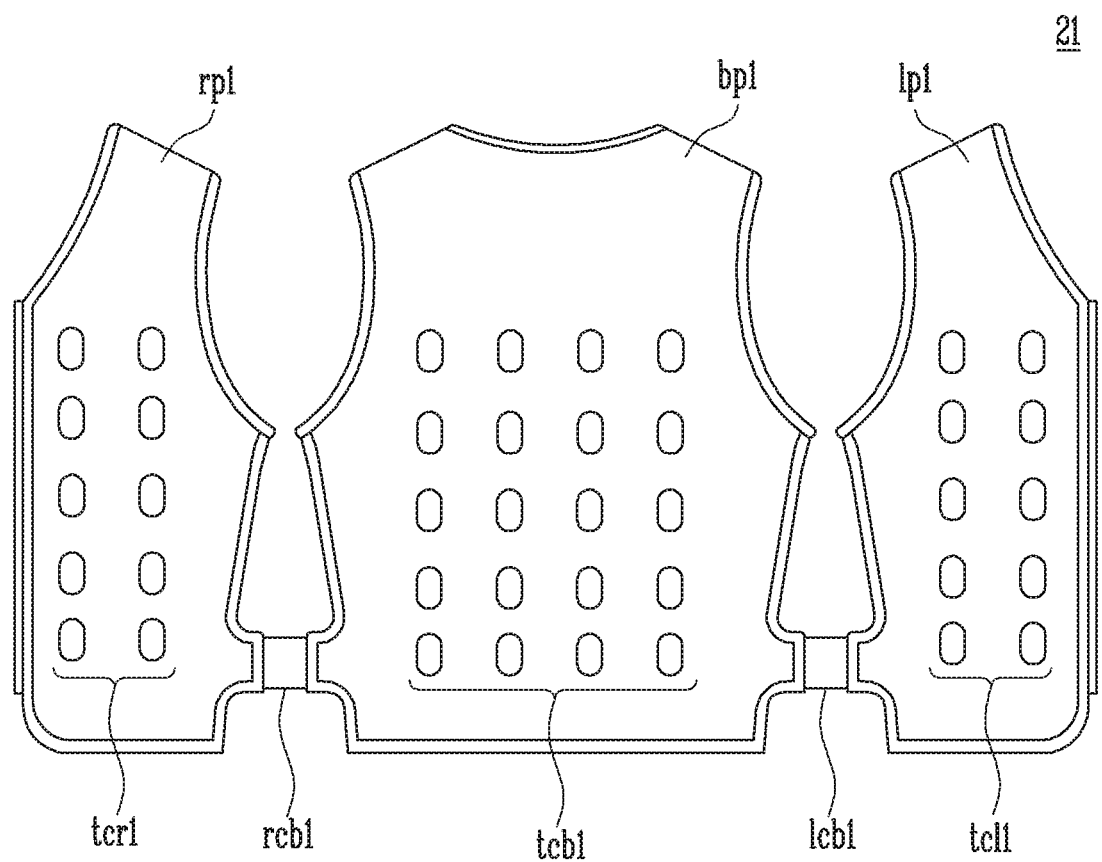
FIG. 14 is a view illustrating a case where front panels of the tactile stimulation providing apparatus shown in FIG. 12 are unfolded.

FIG. 12 is a front view of a tactile stimulation providing apparatus formed in the form of a vest in accordance with an embodiment of the present invention, FIG. 13 is a rear view of the tactile stimulation providing apparatus shown in FIG. 12, and FIG. 14 is a view illustrating a case where front panels of the tactile stimulation providing apparatus shown in FIG. 12 are unfolded.

Referring to FIGS. 12 to 14, the tactile stimulation providing apparatus 21 may include a first front panel rp1, a second front panel lp1, and a rear panel bp1. Each of the panels rp1, lp1, and bp1 may be configured with a plurality of layers, and at least one layer among the plurality of layers may correspond to a base band. One surface of the base band may be located in the panel not to be seen. The other surface of the base band may be exposed to the inside with reference to FIG. 14.

The first front panel rp1 may include a plurality of actuators arranged between one side and the other side thereof. The second front panel lp1 may include a plurality of actuators arranged between one side and the other side thereof. The one side of the second front panel lp1 may be fastened to the other side of the first front panel rp1. For example, the one side of the second front panel lp1 and the other side of the first front panel rp1 may be fastened to each other through a zipper, VELCRO® (a hook and loop fastener), a buckle, or a button.

The rear panel bp1 may include a plurality of actuators arranged between one side and the other side thereof. The one side of the rear panel bp1 may be fastened to the one side of the first front panel rp1, and the other side of the rear panel bp1 may be fastened to the other side of the second front panel lp1.

The rear panel bp1 may include a first ring rr1 connected to the one side thereof and a second ring lr1 connected to the other side thereof. The first front panel rp1 may Include a first wing band rwb1 connected to the one side thereof. The second front panel lp1 may include a second wing band lwb1 connected to the other side thereof.

A detachable member rv21 may be located at one end of a front surface of the first wing band rwb1. A detachable member rv11 may be located on a front surface of the first front panel rp1, and be detachable from the detachable member rv21.

A detachable member lv21 may be located at one end of a front surface of the second wing band lwb1. A detachable member lv11 may be located on a front surface of the second front panel lp1, and be detachable from the detachable member lv21.

A user allows one end of the first wing band rwb1 to pass through the first ring rr1 and then pulls the first wing band rwb1 to fit a body size of the user, and attaches the detachable member rv21 to the detachable member rv11, so that the first front panel rp1 can be adhered closely to a torso of the user. Similarly, the user allows one end of the second wing band lwb1 to pass through the second ring lr1 and then pulls the second wing band lwb1 to fit the body size of the user, and attaches the detachable member lv21 to the detachable member lv11, so that the second front panel lp1 can be adhered closely to the torso of the user.

In accordance with an embodiment, a width of the one end of the first wing band rwb1 may be greater than that of the inner circumference of the first ring rr1, and a width of the one end of the second wing band lwb1 may be greater than that of the inner circumference of the second ring lr1. For example, the one end of the first wing band rwb1 and the one end of the second wing band lwb1 may have a trumpet shape or hook shape. Thus, when a user removes the tactile stimulation providing apparatus 21 from a torso of the user, the one ends of the wing bands rwb1 and lwb1 maintain a state in which they are caught by the respective rings rr1 and lr1, so that a process in which a next user again inserts the wing bands rwb1 and lwb1 into the respective rings rr1 and lr1 when the next user wears the tactile stimulation providing apparatus 21 can be omitted.

The rear panel bp1 may further include a pocket bpp1 for keeping a battery or other usages. An opening may be formed at a portion of the pocket bpp1 such that an electric wire of a battery can extend to the inside of the panels lp1, rp1, and bp1. In another embodiment, a controller may use an internal battery. Therefore, the pocket bpp1 may be unnecessary.

Referring to FIG. 14, each of the first front panel rp1, the rear panel bp1, and the second front panel lp1 of the tactile stimulation providing apparatus 21 in accordance with the another embodiment of the present invention may include a plurality of actuators.

When the front panels rp1 and lp1 are unfolded as shown in FIG. 14, a plurality of top cases tcr1 of the first front panel rp1, a plurality of top cases tcb1 of the rear panel bp1, and a plurality of top cases tcl1 of the second front panel lp1 may be exposed.

The plurality of top cases tcr1, tcb1, and tcl1 may be adhered closely to a torso of a user, when the tactile stimulation providing apparatus 21 is tightened around the torso of the user by the wing bands lwb1 and rwb1, the detachable members rv11, rv21, lv11, and lv21, and the rings lr1 and rr1. Thus, the user can strongly feel vibrations of the plurality of actuators built in the plurality of top cases tcr1, tcb1, and tcl1 through the plurality of top cases tcr1, tcb1, and tcl1 adhered closely to the torso of the user.

In another embodiment, inside skins severing as linings of the panels rp1, bp1, and lp1 may cover the plurality of top cases tcr1, tcb1, and tcl1 such that the plurality of top cases tcr1, tcb1, and tcl1 are not exposed to the outside.

In some embodiments, the first front panel rp1 may be elastically connected to the rear panel bp1 through a connection band rcb1. The second front panel lp1 may be elastically connected to the rear panel bp1 through a connection band 1cb1.

Figure 15:
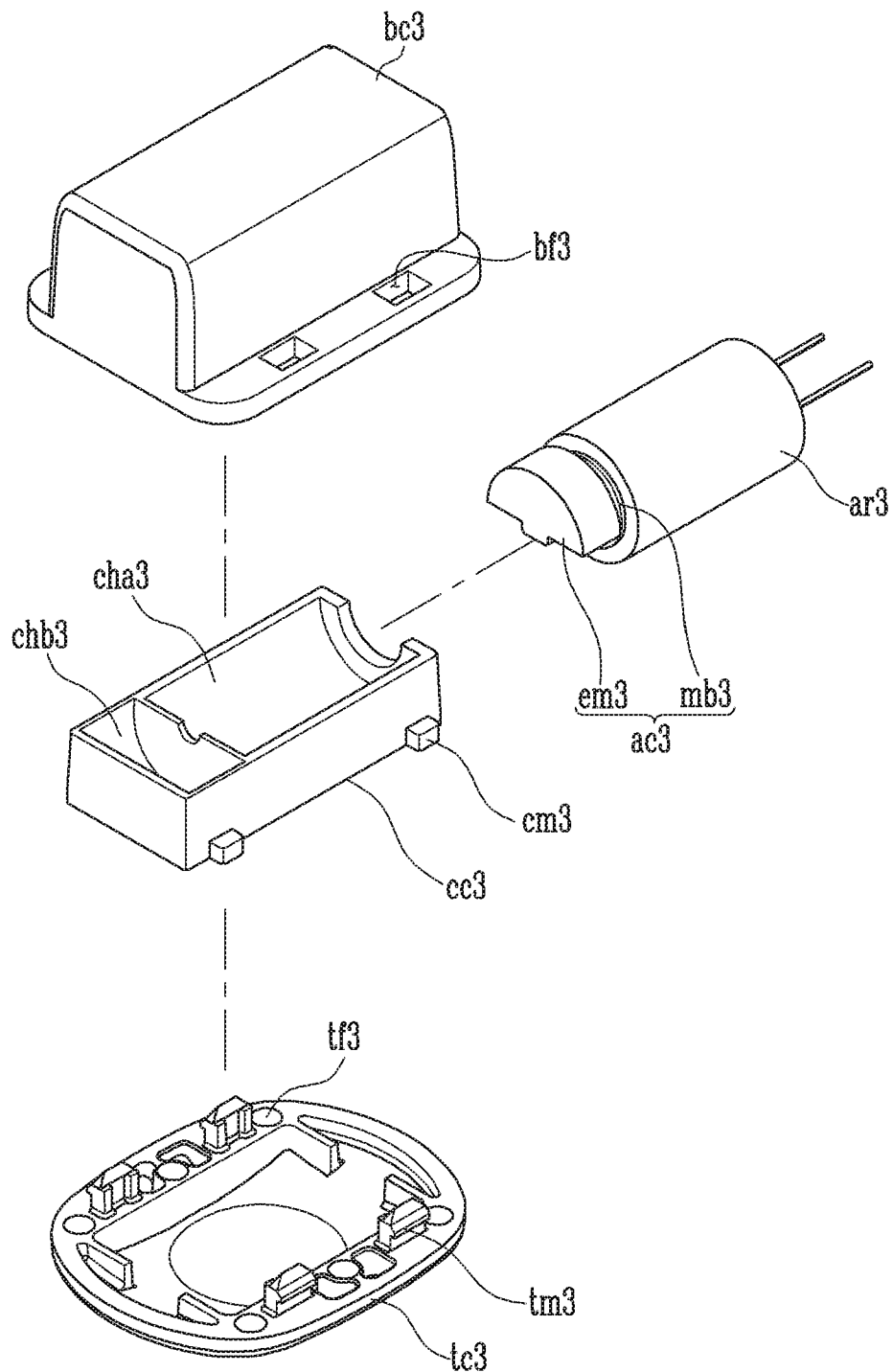
FIG. 15 is a view illustrating an actuator case at a point of view in accordance with still another embodiment of the present invention.
Figure 16:
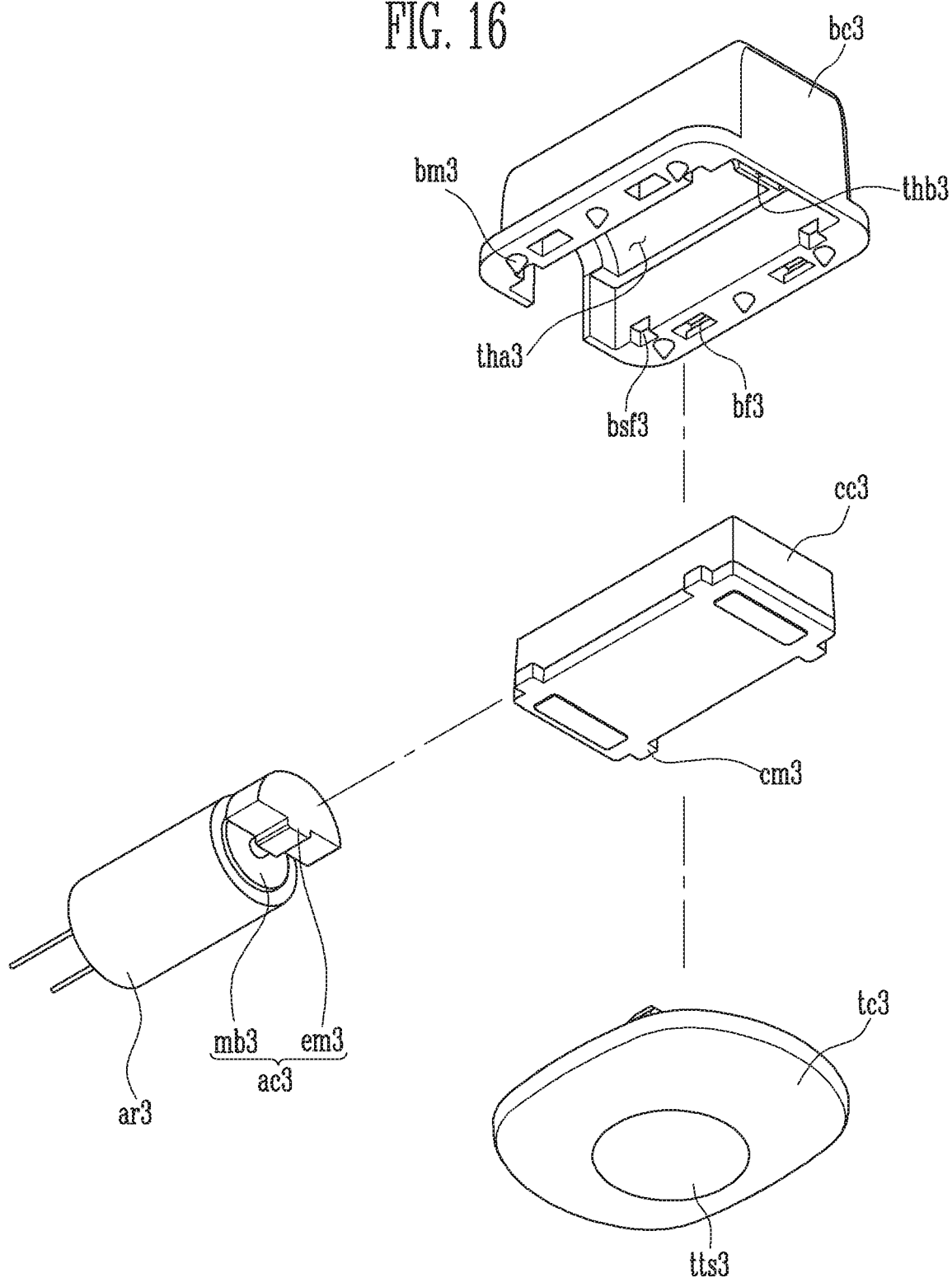
FIG. 16 is a view illustrating the actuator case shown in FIG. 15 at another point of view.

FIG. 15 is a view illustrating an actuator case at a point of view in accordance with still another embodiment of the present invention and FIG. 16 is a view illustrating the actuator case shown in FIG. 15 at another point of view.

Referring to FIGS. 15 and 16, the actuator case 3 in accordance with the still another embodiment of the present invention may include a bottom case bc3, a cover case cc3, and a top case tc3.

A position relationship of the bottom case bc3, the cover case cc3, and the top case tc3 may be determined based on a base band. The base band may be located between the cover case cc3 and the top case tc3.

An actuator ac3 is located on one surface of the base band, and includes a driver mb3 and an eccentric mass em3. The driver mb3 and the eccentric mass em3 may be rotatably connected through a shaft. The actuator ac3 may be an ERM. The actuator ac3 may generate a vibration when the eccentric mass em3 rotated by the driver mb3 serves as an imbalanced vibrator. The actuator ac3 may be a cylindrical vibration motor that has a diameter of about 6 mm and has a total height of about 17 mm. While a coin-shaped motor generates a vibration in a horizontal direction when a vibrator is rotated horizontally, the actuator ac3 of this embodiment may generate a vibration in a vertical direction.

The bottom case bc3 is located on the one surface of the base band, and includes a first accommodation part tha3 for accommodating the driver mb3 and a second accommodation part thb3 for accommodating the eccentric mass em3. That is, the bottom case bc3 may accommodate the whole or a portion of the actuator ac3 except a line. In some embodiments, when the bottom case bc3 accommodates only a portion of the actuator ac3, the other portion of the actuator ac3 may be accommodated by the cover case cc3 which will be described later.

The cover case cc3 is located on the one surface of the base band, and is coupled to the bottom case bc3 to allow the driver mb3 to be adhered closely to the first accommodation part tha3.

Referring to FIGS. 15 and 16, the cover case cc3 may be coupled to the bottom case bc3 while covering the actuator ac3. A male fastening part cm3 of the cover case cc3 is fitted into a female fastening part bsf3 of the bottom case bc3, so that the cover case cc3 can be firmly fixed to the bottom case bc3. In particular, the first accommodation part tha3 and an accommodation part cha3 may be formed such that the driver mb3 of the actuator ac3 can be firmly fixed. The male fastening part cm3 of the cover case cc3 may protrude such that the cover case cc3 is parallel to the surface on which the cover case cc3 is in contact with the base band. In this embodiment, four pairs of the male fastening parts cm3 and the female fastening parts bsf3 are provided. However, in some embodiments, the number of the male fastening parts cm3 and the female fastening parts bsf3 may vary.

In this embodiment, unlike FIGS. 10 and 11, the actuator ac3 may further include a spacer ar3 that covers at least a portion of the driver mb3 and is interposed between the driver mb3 and the first accommodation part tha3. For example, the spacer ar3 may have a cylindrical shape surrounding the outer circumference of the driver mb3. The spacer ar3 may allow the driver mb3, the first accommodation part tha3, and the accommodation part cha3 to be spaced apart from each other. The spacer ar3 may be made of an elastic material such as rubber, silicon, polyurethane, or sponge. A gap may occur between the driver mb3, the first accommodation part tha3, and the accommodation part cha3 due to a process variation, and hence the spacer ar3 prevents noise that may occur due to the process variation. Also, the spacer ar3 may prevent noise that may occur in the actuator ac3 since a load where each actuator ac3 is to be vibrated is not constant.

The cover case cc3 is coupled to the bottom case bc3, to form, along with the second accommodation part thb3, an extra rotating space of the eccentric mass em3 while allowing the eccentric mass em3 to be spaced apart from the one surface of the base band. That is, an accommodation part chb3 of the cover case cc3 is matched to the second accommodation part thb3, to form an extra rotating space that does not interfere with rotation of the eccentric mass em3. Also, the accommodation part chb3 of the cover case cc3 functions to allow the eccentric mass em3 to be spaced apart from the one surface of the base band. Thus, even when the base band is made of a flexible cloth or rubber material, the eccentric mass em3 can be reliably rotated without colliding with the base band.

The top case tc3 is located on the other surface of the base band, and allows the bottom case bc3 to be fixed to the base band.

A male fastening part tm3 of the top case tc3 penetrates the base band and is coupled to a female fastening part bf3, so that the actuator ac3 and the actuator case 3 can be fixed to the base band. The base band may include an opening having a shape through which the male fastening part tm3 can pass. In some embodiments, an area of the top case tc3 adhered closely to the other surface of the base band may correspond to that of the bottom case bc3 adhered closely to the one surface of the base band. Since a space in which the male fastening part tm3 can be located is relatively sufficient, four pairs of the male fastening parts tm3 and the female fastening parts bf3 are provided in this embodiment. Thus, although the actuator ac3 is more strongly vibrated, this can be endured. Further, as compared with an upper surface tts2 of the top case tc2 shown in FIG. 11, an upper surface tts3 of the top case tc3 shown in FIG. 16 has a narrow area, so that a locally concentrated vibration force can be propagated to a body of a user. For example, the top case tc3 may be formed in the shape of a truncated cone.

The bottom case bc3 may include a protrusion part bm3, and the top case tc3 may include a recessed part tf3. The protrusion part bm3 of the bottom case bc3 is fitted into the recessed part tf3 while pressurizing the base band, so that the actuator ac3 and the actuator case 3 can be more firmly fixed to the base band. In this embodiment, since the area of a lower surface of the top case tc3 is relatively sufficient, six pairs of the protrusion parts bm3 and the recessed parts tf3 are provided, so that a sufficient supporting force can be provided.

Figure 17:
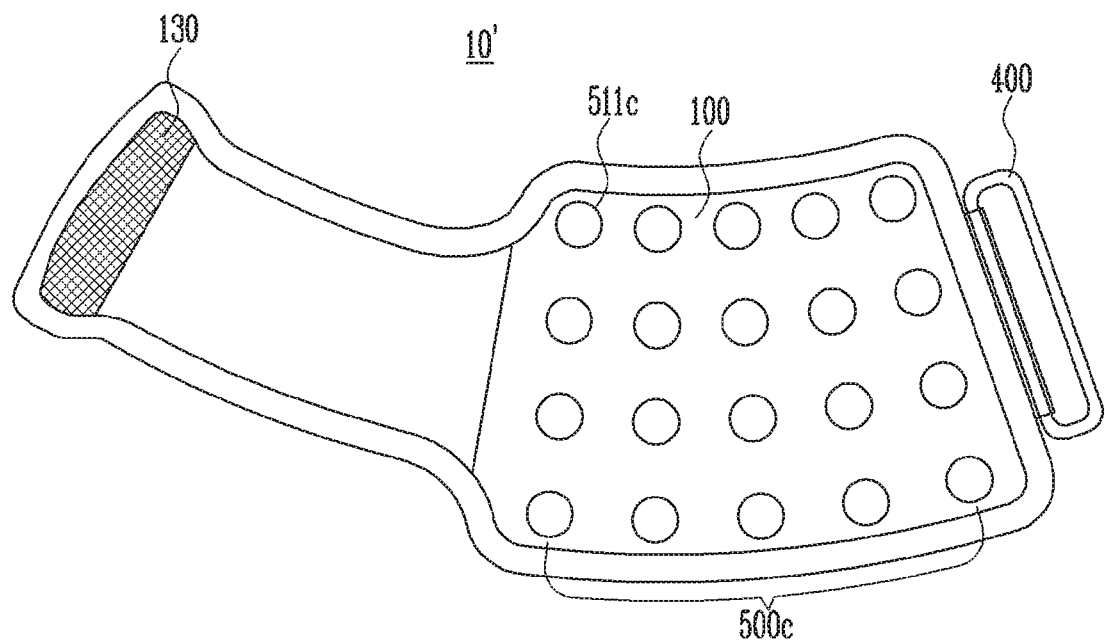
FIG. 17 is a rear view of a tactile stimulation providing apparatus formed in the shape of an arm warmer in accordance with another embodiment of the present invention.
Figure 18:
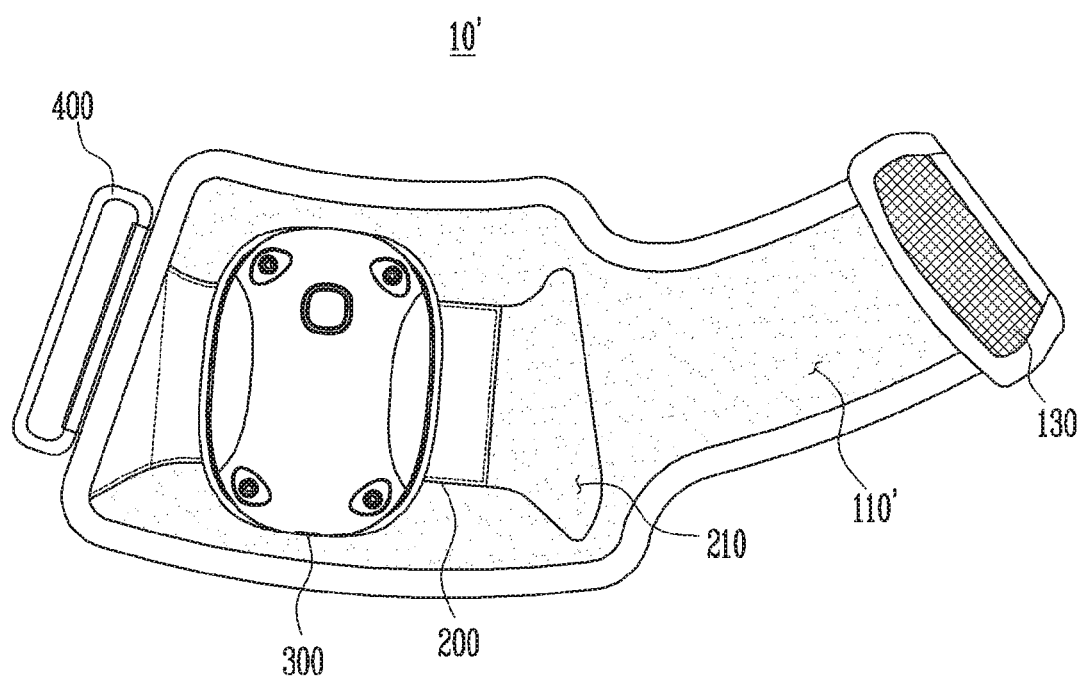
FIG. 18 is a view illustrating a case where the size of the tactile stimulation providing apparatus shown in FIG. 17 is adjusted.

FIG. 17 is a rear view of a tactile stimulation providing apparatus formed in the shape of an arm warmer in accordance with another embodiment of the present invention and FIG. 18 is a view illustrating a case where the size of the tactile stimulation providing apparatus shown in FIG. 17 is adjusted.

The tactile stimulation providing apparatus 10' shown in FIG. 17 may further include a detachable member 130, as compared with the tactile stimulation providing apparatus 10.

The detachable member 130 may be located at the other end of the rear surface of the base band 100, and be detachable from a detachable member 110' (see FIG. 18). The detachable member 130 may be a detachable member of the type B.

Referring to FIG. 18, the other end of the base band 100 is folded, so that the detachable member 110' and the detachable member 120 can be attached and fixed to each other. In this state, a length of the other end of the tactile stimulation providing apparatus 10' becomes shorter than that of the other end of the tactile stimulation providing apparatus 10 shown in FIG. 4. In this state, the detachable member 130 substitutes of functions of the detachable member 120. In particular, this state may be useful for people having thin wrists, such as women.

In addition, the tactile stimulation providing apparatus 10' may include the detachable member 110' having an area wider than that of the detachable member 110 of the tactile stimulation providing apparatus 10 shown in FIG. 4. For example, the detachable member 110' may be located in the entire region of the front surface of the base band 100 except a region in which the detachable member 120 is located. The protective cover CV shown in FIG. 4 may not exist in the tactile stimulation providing apparatus 10'. In the tactile stimulation providing apparatus 10', the detachable member 110' may serve as the protective cover CV. The detachable member 110' having a widened area may provide an extra region in which the detachable member on the rear surface of the auxiliary band 200 can be detachable. Thus, the tactile stimulation providing apparatus 10' can handle various bodies of users.

The other configuration of the tactile stimulation providing apparatus 10' is substantially identical or similar to that of the tactile stimulation providing apparatus 10, and therefore, overlapping descriptions will be omitted.

Figure 19:
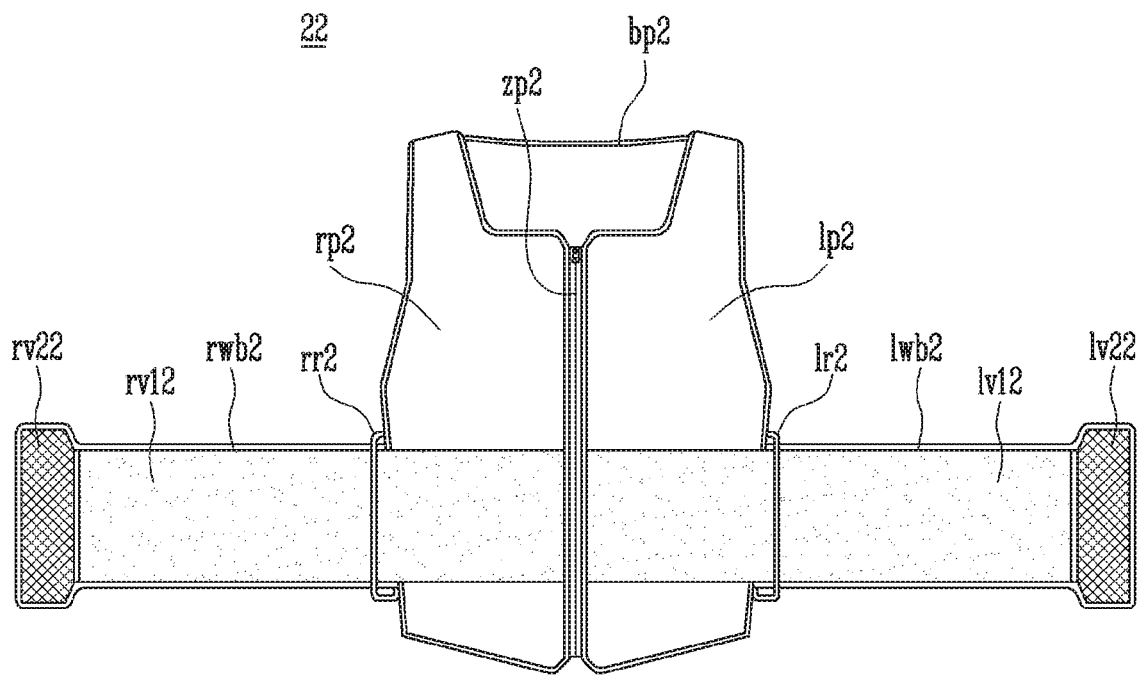
FIG. 19 is a front view of a tactile stimulation providing apparatus formed in the form of a vest in accordance with another embodiment of the present invention.
Figure 20:
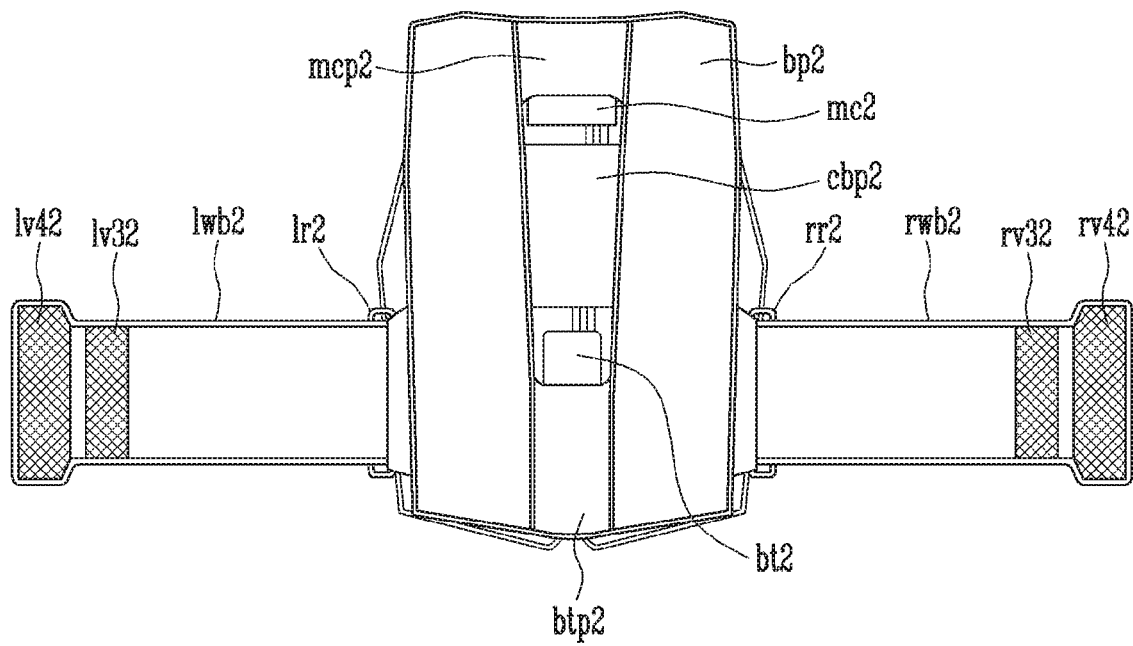
FIG. 20 is a rear view of the tactile stimulation providing apparatus shown in FIG. 19.

FIG. 19 is a front view of a tactile stimulation providing apparatus formed in the form of a vest in accordance with another embodiment of the present invention and FIG. 20 is a rear view of the tactile stimulation providing apparatus shown in FIG. 19.

Referring to FIGS. 19 and 20, the tactile stimulation providing apparatus 22 may include a first front panel rp2, a second front panel lp2, and a rear panel bp2. Each of the panels rp2, lp2, and bp2 may be configured with a plurality of layers, and at least one layer among the plurality of layers may correspond to a base band.

The first front panel rp2 may include a plurality of actuators arranged between one side and the other side thereof. The second front panel lp2 may include a plurality of actuators arranged between one side and the other side thereof. The one side of the second front panel lp2 may be fastened to the other side of the first front panel rp2. For example, the one side of the second front panel lp2 and the other side of the first front panel rp2 may be fastened to each other through a fastening member zp2 such as a zipper, VELCRO® (a hook and loop fastener), a buckle, or a button.

The rear panel bp2 may include a plurality of actuators arranged between one side and the other side thereof. The one side of the rear panel bp2 may be fastened to the one side of the first front panel rp2, and the other side of the rear panel bp2 may be fastened to the other side of the second front panel lp2.

The rear panel bp2 may include a first ring rr2 connected to the one side thereof and a second ring lr2 connected to the other side thereof. The first front panel rp2 may include a first wing band rwb2 connected to the one side thereof. The second front panel lp2 may include a second wing band lwb2 connected to the other side thereof.

A detachable member rv22 may be located at one end of a front surface of the first wing band rwb2. A detachable member rv12 may be located on a front surface of the first front panel rp2, and be detachable from the detachable member rv22. In accordance with an embodiment, the detachable member rv12 may extend from the front surface of the first front panel rp2 to be located on the front surface of the first wing band rwb2. An extending portion of the detachable member rv12 may be used such that detachable members rv22 and rv42 are attached thereto.

A detachable member lv22 may be located at one end of a front surface of the second wing band lwb2. A detachable member lv12 may be located on a front surface of the second front panel lp2, and be detachable from the detachable member lv22. In accordance with an embodiment, the detachable member lv12 may extend from the front surface of the second front panel lp2 to be located on the front surface of the second wing band lwb2. An extending portion of the detachable member lv12 may be used such that detachable members lv22 and lv42 are attached thereto.

For example, the detachable members rv22 and lv22 may be detachable members of the type B, and the detachable members rv12 and lv12 may be detachable members of the type A.

A user allows one end of the first wing band rwb2 to pass through the first ring rr2 and then pulls the first wing band rwb2 to fit a body size of the user, and attaches the detachable member rv22 to the detachable member rv12, so that the first front panel rp2 can be adhered closely to a torso of the user. Similarly, the user allows one end of the second wing band lwb2 to pass through the second ring lr2 and then pulls the second wing band lwb2 to fit the body size of the user, and attaches the detachable member lv22 to the detachable member lv12, so that the second front panel lp2 can be adhered closely to the torso of the user.

In accordance with an embodiment, a width of the one end of the first wing band rwb2 may be greater than that of the inner circumference of the first ring rr2, and a width of the one end of the second wing band lwb2 may be greater than that of the inner circumference of the second ring lr2. For example, the one end of the first wing band rwb2 and the one end of the second wing band lwb2 may have a trumpet shape or hook shape. Thus, when a user removes the tactile stimulation providing apparatus 22 from a torso of the user, the one ends of the wing bands rwb2 and lwb2 maintain a state in which they are caught by the respective rings rr2 and lr2, so that a process in which a next user again inserts the wing bands rwb2 and lwb2 into the respective rings rr2 and lr2 when the next user wears the tactile stimulation providing apparatus 22 can be omitted.

The tactile stimulation providing apparatus 22 may further include detachable members rv42, rv32, lv42, and lv32, as compared with the tactile stimulation providing apparatus 21 shown in FIG. 12.

A detachable member rv42 may be located at one end of a rear surface of the first wing band rwb2, and be detachable from the detachable member rv12. The detachable member rv42 may be a detachable member of the type B. A detachable member lv42 may be located at one end of a rear surface of the second wing band lwb2, and be detachable from the detachable member lv12. The detachable member lv42 may be a detachable member of the type B.

In addition, a detachable member rv32 may be located between the detachable member rv42 and the other end of the first wing band rwb2 on the rear surface of the first wing band rwb2, and be detachable from the detachable member rv12. The detachable member rv32 may be a detachable member of the type B. A detachable member lv32 may be located between the detachable member lv42 and the other end of the second wing band lwb2 on the rear surface of the second wing band lwb2, and be detachable from the detachable member lv12. The detachable member lv32 may be a detachable member of the type B.

A controller pocket mcp2 for accommodating a controller case mc2 and a battery pocket btp2 for accommodating a battery bt2 may be located on a rear surface of the rear panel bp2. Also, a line pocket cbp2 through which a line connecting a controller in the controller case mc2 and the battery bt2 passes may be further located on the rear surface of the rear panel bp2. In another embodiment, a battery may be located in the controller case mc2. Therefore, the battery pocket btp2 and the line pocket cbp2 may be unnecessary.

Figure 21:
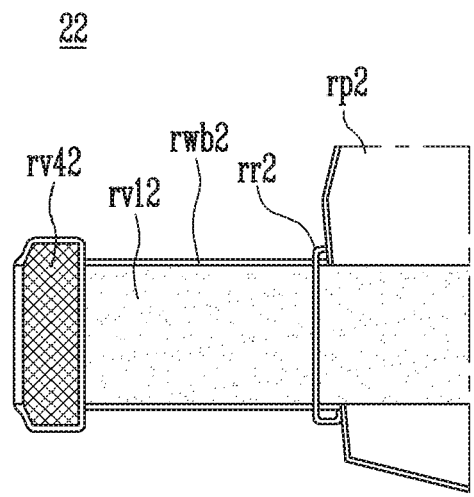
FIG. 21 is a view illustrating a case where the size of the tactile stimulation providing apparatus shown in FIG. 19 is adjusted in a first step.

FIG. 21 is a view illustrating a case where the size of the tactile stimulation providing apparatus shown in FIG. 19 is adjusted in a first step.

Referring to FIG. 21, the detachable member rv22 is attached to the detachable member rv12. In this state, the detachable member rv42 may serve as the existing detachable member rv22. That is, a user allows one end of the first wing band rwb2 to pass through the first ring rr2 and then pulls the first wing band rwb2 to fit a body size of the user, and attaches the detachable member rv42 to the detachable member rv12, so that the first front panel rp2 can be adhered closely to a torso of the user.

Thus, even a user having a small size of a torso, such as a woman, reduces the lengths of the wing bands rwb2 and lwb2 in the first step, so that the tactile stimulation providing apparatus 22 can be fixed.

Figure 22:
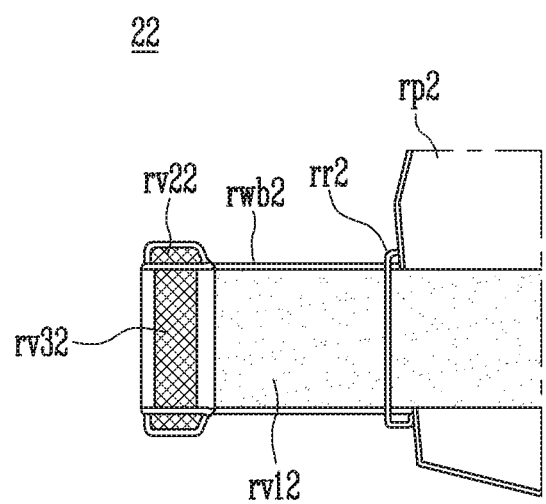
FIG. 22 is a view illustrating a case where the size of the tactile stimulation providing apparatus shown in FIG. 19 is adjusted in a second step.

FIG. 22 is a view illustrating a case where the size of the tactile stimulation providing apparatus shown in FIG. 19 is adjusted in a second step.

Referring to FIG. 22, the detachable member rv42 is attached to the detachable member rv12. In this state, the detachable member rv32 may serve as the existing detachable member rv22. That is, a user allows one end of the first wing band rwb2 to pass through the first ring rr2 and then pulls the first wing band rwb2 to fit a body size of the user, and attaches the detachable member rv32 to the detachable member rv12, so that the first front panel rp2 can be adhered closely to a torso of the user.

Thus, even users having smaller sizes of torsos than that in the state shown in FIG. 21 reduce the lengths of the wing bands rwb2 and lwb2 in the second step, so that the tactile stimulation providing apparatus 22 can be fixed.

Figure 23:
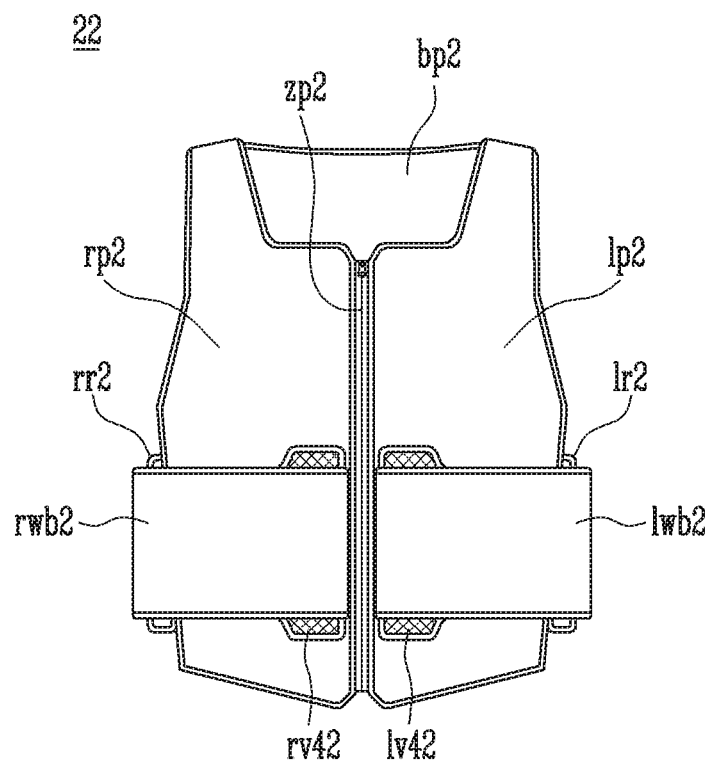
FIG. 23 is a view illustrating a state in which the tactile stimulation providing apparatus shown in FIG. 19 is two-step adjusted to be worn by a user.

FIG. 23 is a view illustrating a state in which the tactile stimulation providing apparatus shown in FIG. 19 is two-step adjusted to be worn by a user.

Referring to FIG. 23, it can be seen that end portions of the wing bands rwb2 and lwb2 do not cross the fastening member zp2. That is, in accordance with the embodiments shown in FIGS. 21 to 23, the first wing band rwb2 can be prevented from being attached to the detachable member lv12 while crossing the fastening member zp2, and the second wing band lwb2 can be prevented from being attached to the detachable member rv12 while crossing the fastening member zp2.

When the wing bands rwb2 and lwb2 are attached to the detachable members lv12 and rv12 of the opposite panels while crossing the fastening member zp2, there may occur an inconvenience that the user cannot release wearing of the tactile stimulation providing apparatus 22 even though the user detaches the fastening member zp2.

Figure 24:
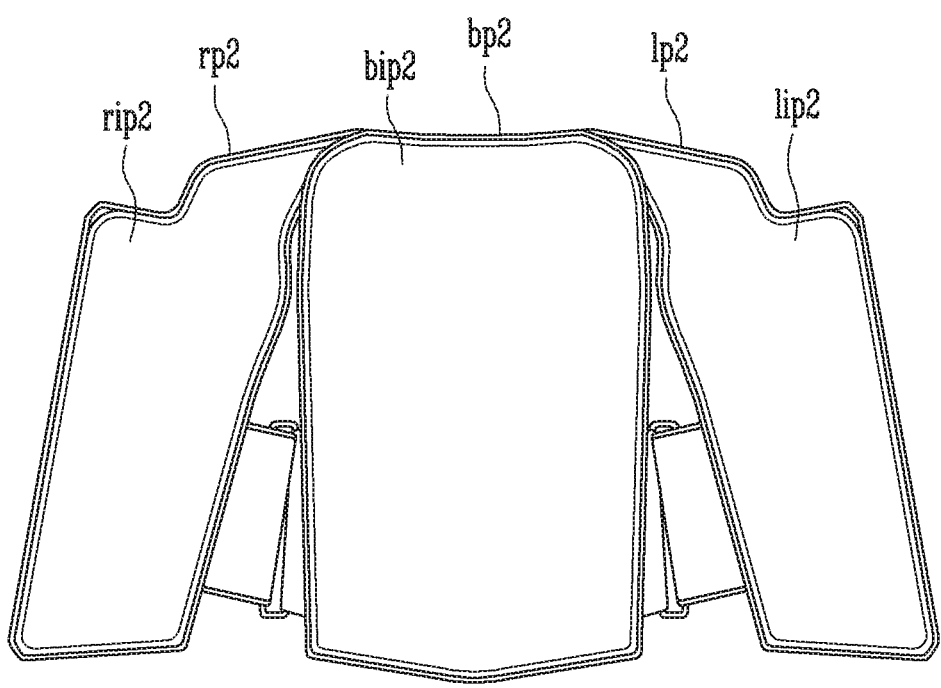
FIG. 24 is a view illustrating a case where front panels of the tactile stimulation providing apparatus shown in FIG. 19 are unfolded.

FIG. 24 is a view illustrating a case where the front panels of the tactile stimulation providing apparatus shown in FIG. 19 are unfolded.

Referring to FIG. 24, the tactile stimulation providing apparatus 22 may include a first inside skin rip2, a second inside skin lip2, and a third inside skin bip2.

The first to third inside skins rip2, lip2, and bip2 may be made of a waterproof material. The first to third inside skins rip2, lip2, and bip2 may be made of a material having excellent hygroscopicity and air permeability, such as a mesh.

The first inside skin rip2 may be located on a rear surface of the first front panel rp2. The first inside skin rip2 may be detachable from the rear surface of the first front panel rp2 through a detachable member.

The second inside skin lip2 may be located on a rear surface of the second front panel lp2. The second inside skin lip2 may be detachable from the rear surface of the second front panel lp2 through a detachable member.

The third inside skin bip2 may be located on a rear surface of the rear panel bp2. The third inside skin bip2 may be detachable from the rear surface of the rear panel bp2 through a detachable member.

The first to third inside skins rip2, lip2, and bip2 are replaced or cleaned, so that a plurality of users can use the tactile stimulation providing apparatus 22 without displeasure.

Figure 25:
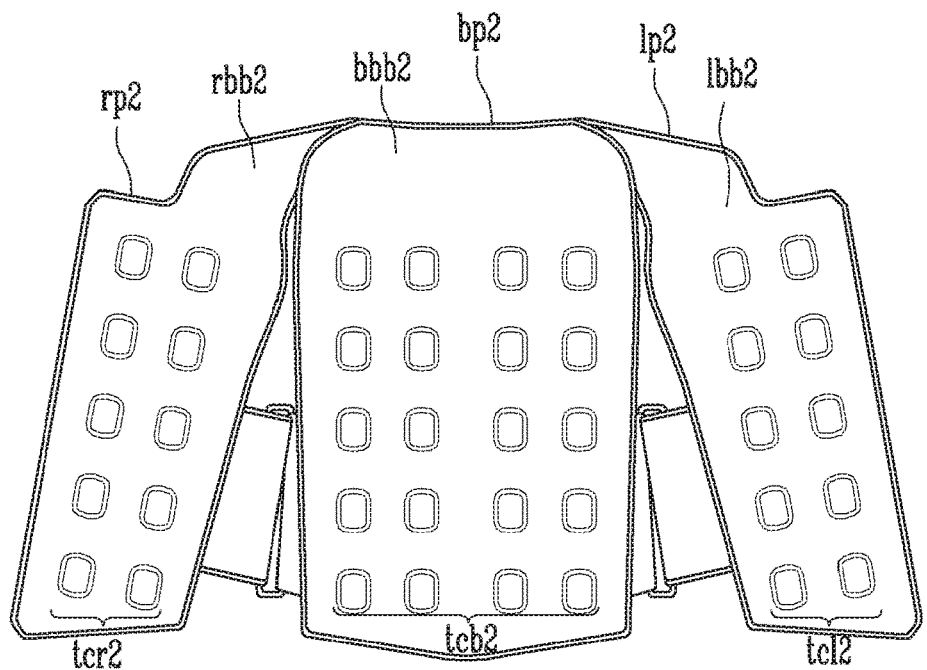
FIG. 25 is a view illustrating a case where inside skins are removed in the state shown in FIG. 24.

FIG. 25 is a view illustrating a case where the inside skins are removed in the state shown in FIG. 24.

Referring to FIG. 25, a plurality of top cases tcr2 may be arranged on the other surface of a first base band rbb2 of the first front panel rp2. In addition, a plurality of top cases tcl2 may be arranged on the other surface of a second base band lbb2 of the second front panel lp2. In addition, a plurality of top cases tcb2 may be arranged on the other surface of a third base band bbb2 of the rear panel bp2.

Figure 26:
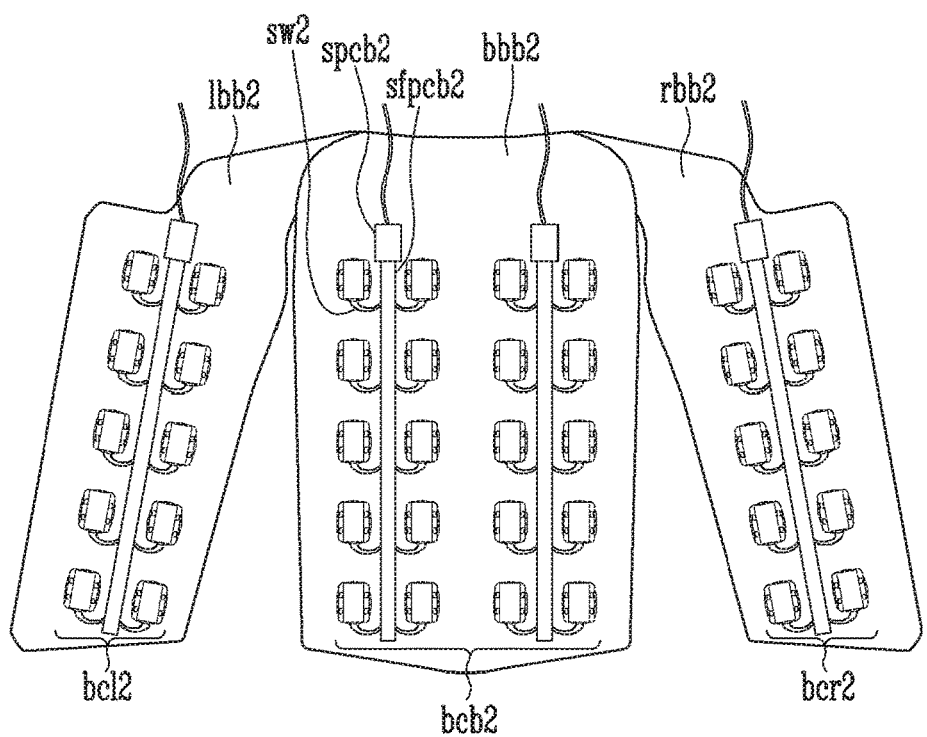
FIG. 26 is a view illustrating one surfaces of base bands separated in the state shown in FIG. 25.

FIG. 26 is a view illustrating one surfaces of the base bands separated in the state shown in FIG. 25.

Referring to FIG. 26, for convenience of description, the base bands rbb2, lbb2, and bbb2 are separated from the tactile stimulation providing apparatus 22, and one surfaces of the base bands rbb2, lbb2, and bbb2 are illustrated.

A plurality of bottom cases bcr2 may be arranged on the one surface of the first base band rbb2, a plurality of bottom cases bcl2 may be arranged on the one surface of the second base band lbb2, and a plurality of bottom cases bcb2 may be arranged on the one surface of the third base band bbb2.

A plurality of cover cases (not shown) may be located between the plurality of top cases tcr2, tcl2, and tcb2 and the plurality of bottom cases bcr2, bcl2, and bcb2. A plurality of actuators (not shown) may be located between the plurality of cover cases and the plurality of bottom cases bcr2, bcl2, and bcb2.

Each actuator may require at least two or three channels (i.e., lines) to receive a ground voltage GND, a driving voltage VDD, a control signal, etc. However, when each of the plurality of actuators used in the tactile stimulation providing apparatus connected to a controller, a number of lines excessively increases, and therefore, the lines may be easily damaged. A rigid line cover may be inserted so as to prevent damage of the lines, but a user may feel inconvenience.

Therefore, in this embodiment, the plurality of actuators may be grouped, actuators of one group may be electrically connected to a sub-FPCB sfpcb2 through lines sw2, and each sub-FPCB sfcb2 may be electrically connected to a corresponding sub-PCB spcb2. The sub-PCB spcb2 may be connected to a controller through a line. The sub-PCB spcb2 may perform wired communication with the controller in a scheme such as RS232, USB, I2C, or SPI. Also, the sub-PCB spcb2 may perform wireless communication with the controller in a scheme such as Bluetooth, WIFI, or Zigbee. Thus, in accordance with this embodiment, although a larger number of actuators are used, the line structure of the actuators can be simplified.

Figure 27:
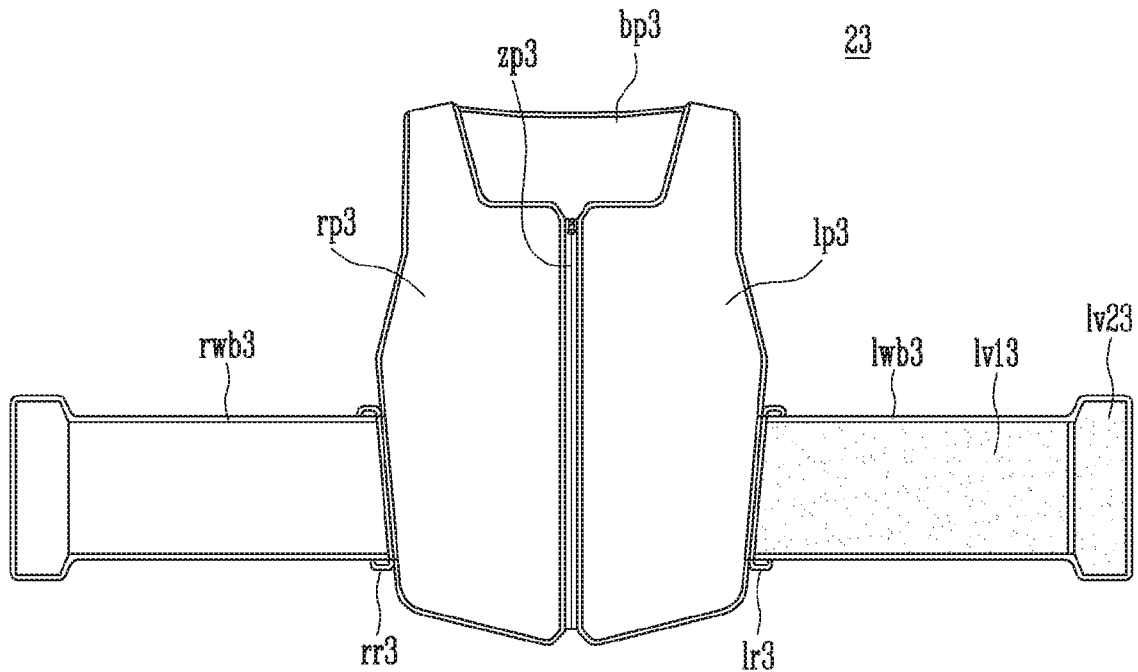
FIG. 27 is a front view of a tactile stimulation providing apparatus formed in the form of a vest in accordance with still another embodiment of the present invention.
Figure 28:
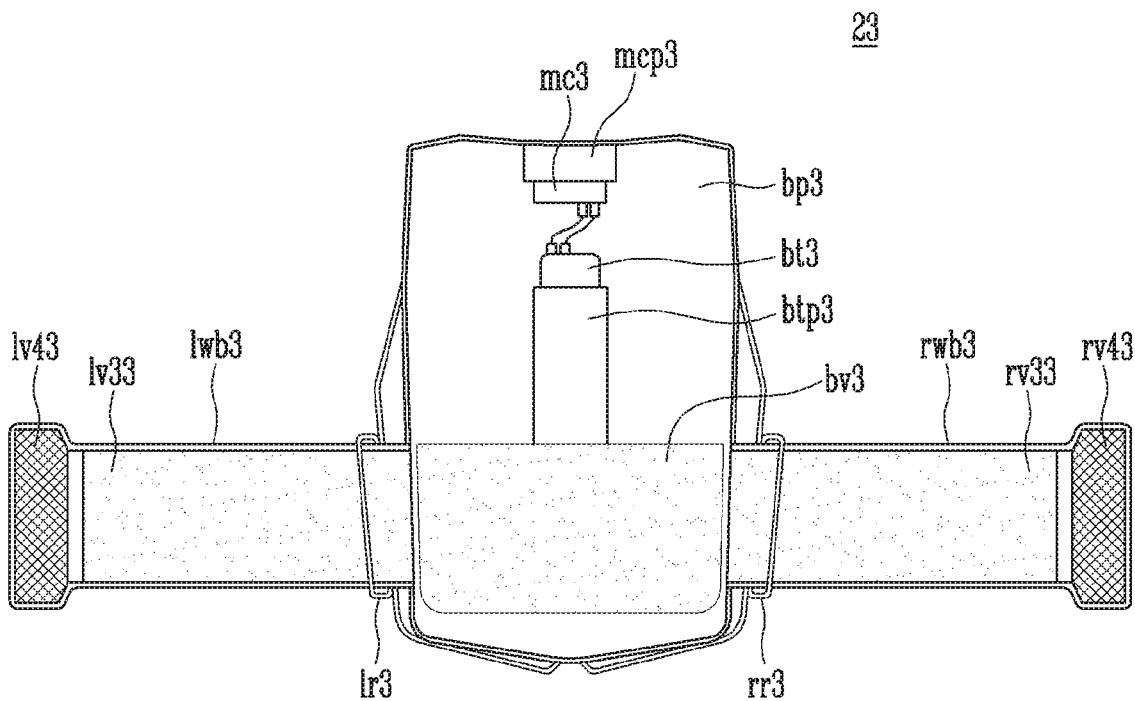
FIG. 28 is a rear view of the tactile stimulation providing apparatus shown in FIG. 27.

FIG. 27 is a front view of a tactile stimulation providing apparatus formed in the form of a vest in accordance with still another embodiment of the present invention and FIG. 28 is a rear view of the tactile stimulation providing apparatus shown in FIG. 27.

Referring to FIGS. 27 and 28, the tactile stimulation providing apparatus 23 may include a first front panel rp3, a second front panel lp3, and a rear panel bp3. Each of the panels rp3, lp3, and bp3 may be configured with a plurality of layers, and at least one layer among the plurality of layers may correspond to a base band.

The first front panel rp3 may include a plurality of actuators arranged between one side and the other side thereof. The second front panel lp3 may include a plurality of actuators arranged between one side and the other side thereof. The one side of the second front panel lp3 may be fastened to the other side of the first front panel rp3. For example, the one side of the second front panel lp3 and the other side of the first front panel rp3 may be fastened to each other through a fastening member zp3 such as a zipper, VELCRO® (a hook and loop fastener), a buckle, or a button.

The rear panel bp3 may include a plurality of actuators arranged between one side and the other side thereof. The one side of the rear panel bp3 may be fastened to the one side of the first front panel rp3, and the other side of the rear panel bp3 may be fastened to the other side of the second front panel lp3.

The rear panel bp3 may include a first wing band rwb3 connected to the one side thereof and a second wing band lwb3 connected to the other side thereof. The first front panel rp3 may include a first ring rr3 connected to the one side thereof. The second front panel lp3 may include a second ring lr3 connected to the other side thereof.

The first wing band rwb3 may include a detachable member rv43 located at one end of a rear surface thereof and a detachable member rv33 located between the detachable member rv43 and the other end of the first wing band rwb3.

The second wing band lwb3 may include detachable members lv13 and lv23 located on a front surface thereof, a detachable member lv43 located at one end of a rear surface thereof, and a detachable member lv33 located between the detachable member lv43 and the other end of the second wing band lwb3.

The rear panel bp3 may include a detachable member bv3 located on a rear surface thereof.

The detachable member lv43 may be detachable from the detachable member bv3. The detachable member rv43 may be detachable from the detachable members lv13, lv23, and bv3. For example, the detachable members lv13, lv23, lv33, bv3, and rv33 may be detachable members of the type A, and the detachable members lv43 and rv43 may be detachable members of the type B.

In accordance with an embodiment, a width of one end of the first wing band rwb3 may be greater than that of the inner circumference of the first ring rr3, and a width of one end of the second wing band lwb3 may be greater than that of the inner circumference of the second ring lr3. For example, the one end of the first wing band rwb3 and the one end of the second wing band lwb3 may have a trumpet shape or hook shape. Thus, when a user removes the tactile stimulation providing apparatus 23 from a torso of the user, the one ends of the wing bands rwb3 and lwb3 maintain a state in which they are caught by the respective rings rr3 and lr3, so that a process in which a next user again inserts the wing bands rwb3 and lwb3 into the respective rings rr3 and lr3 when the next user wears the tactile stimulation providing apparatus 23 can be omitted.

A controller pocket mcp3 for accommodating a controller case mc3 and a battery pocket btp3 for accommodating a battery bt3 may be located on a rear surface of the rear panel bp3. In this embodiment, unlike the embodiment shown in FIG. 20, any line pocket may not separately exist so as to secure a region for the detachable member bv3. In accordance with an embodiment, a battery may be located in the controller case mc3. Therefore, the battery pocket btp3 may be unnecessary.

Figure 29:
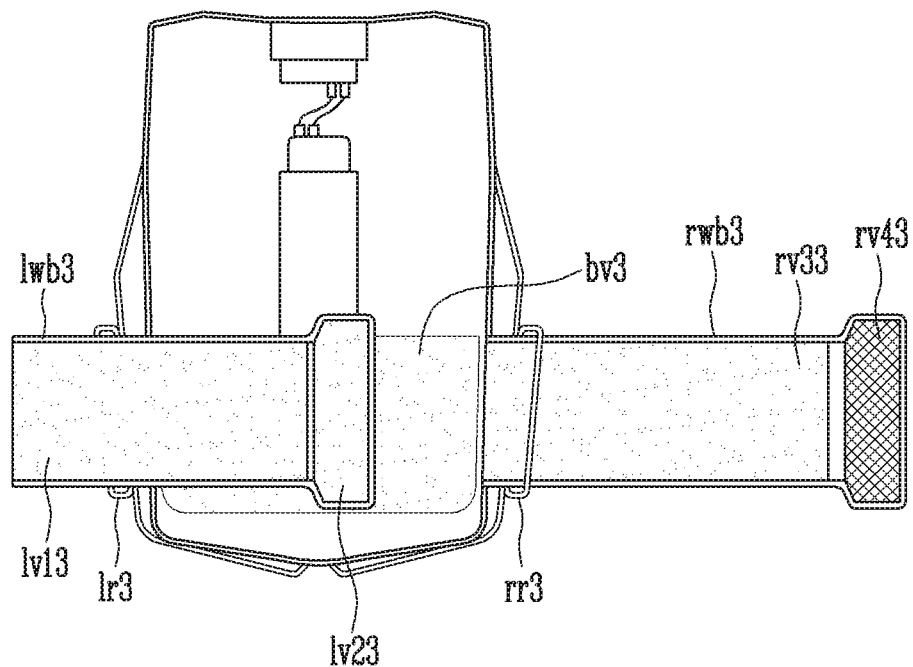
FIGS. 29 and 30 are views illustrating a process in which a user wears the tactile stimulation providing apparatus shown in FIG. 27.
Figure 30:
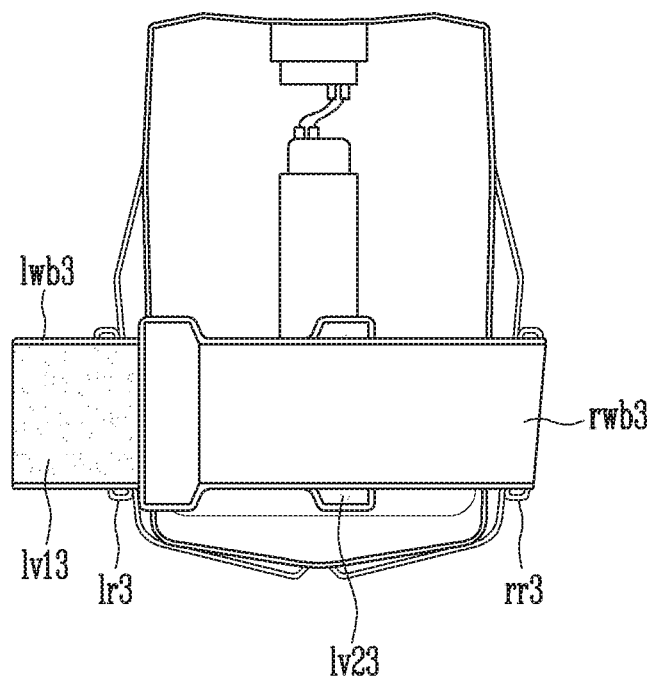

FIGS. 29 and 30 are views illustrating a process in which a user wears the tactile stimulation providing apparatus shown in FIG. 27.

First, the user may allow the one end of the second wing band lwb3 to pass through the second ring lr3 and then pull the second wing band lwb3 to fit a body size of the user, and attach the detachable member lv43 to at least one of the detachable members lv33, bv3, and rv33. Next, the user may allow the one end of the first wing band rwb3 to pass through the first ring rr3 and then pull the first wing band rwb3 to fit the body size of the user, and attach the detachable member rv43 to at least one of the detachable members lv23, lv23, bv3, and rv33.

In accordance with this embodiment, since any detachable member does not exist on front surfaces of the front panels rp3 and lp3, aesthetic impression can be improved. Further, unlike the tactile stimulation providing apparatus 22, the wing bands rwb3 and lwb3 do not overlap with the fastening member zp3 in the tactile stimulation providing apparatus 23 even when the wing bands rwb3 and lwb3 are not folded, so that the tactile stimulation providing apparatus 23 can be easily detachable. Furthermore, since a belly of the user is convex and a back of the user is flat in the body of the user, a front surface of the tactile stimulation providing apparatus 23 may have a streamline shape when the user wears the tactile stimulation providing apparatus 23, and a rear surface of the tactile stimulation providing apparatus 23 may be flat. Thus, it can be more stable that the wing bands rwb3 and lwb3 are attached to the rear surface of the tactile stimulation providing apparatus 23.

Figure 31:
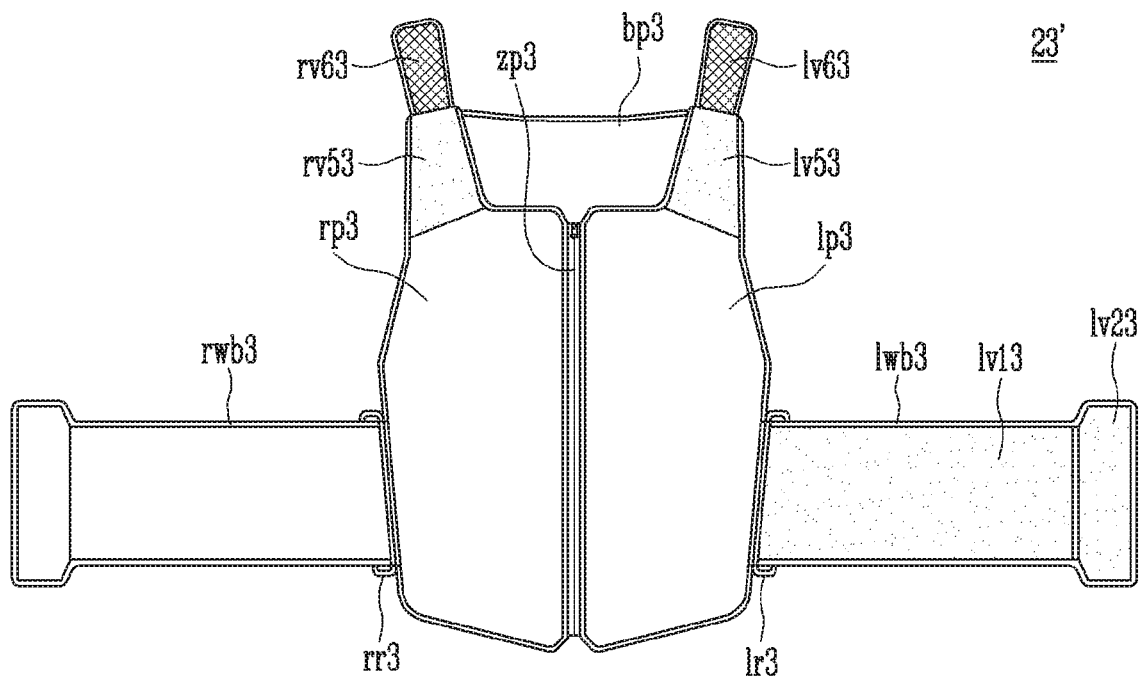
FIGS. 31 and 32 are views illustrating a modification of the tactile stimulation providing apparatus shown in FIG. 27.
Figure 32:
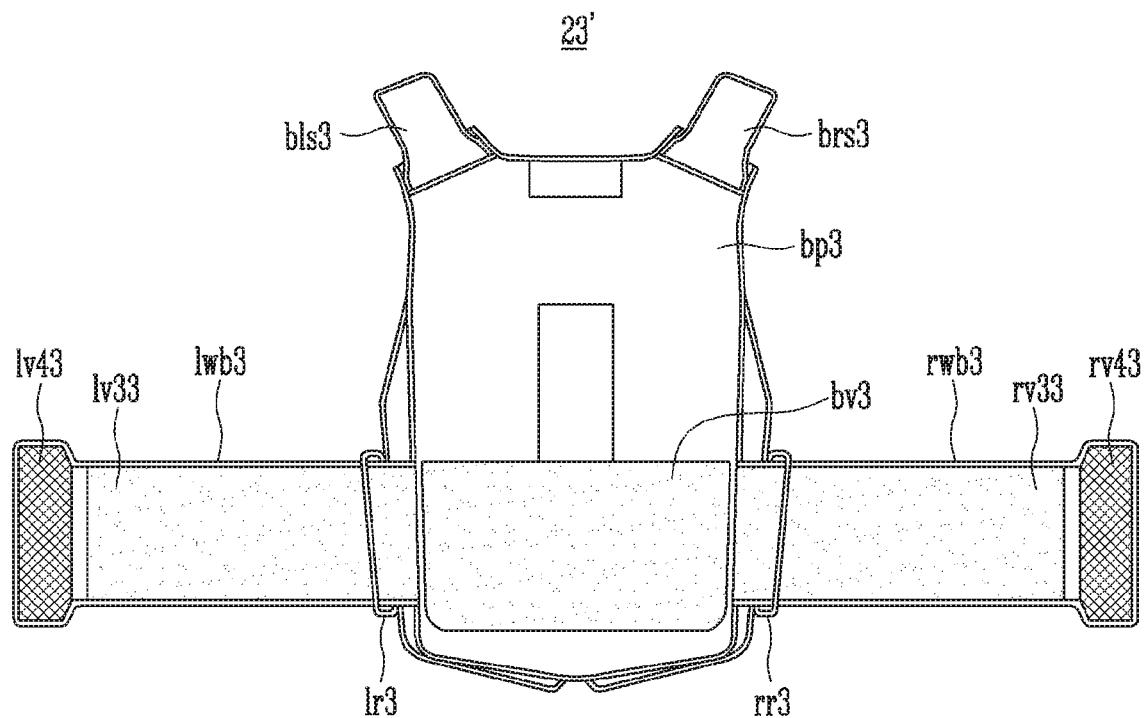

FIGS. 31 and 32 are views illustrating a modification of the tactile stimulation providing apparatus shown in FIG. 27.

Referring to FIGS. 31 and 32, the rear panel bp3 of the tactile stimulation providing apparatus 23' may further include protrusion parts brs3 and bls3. The protrusion parts brs3 and bls3 may be located corresponding to shoulder parts of a user. A detachable member rv63 may be located on one surface of the protrusion part brs3. A detachable member lv63 may be located on one surface of the protrusion part bls3.

The first front panel rp3 may include a detachable member rv53 located corresponding to a shoulder part of the user. The second front panel lp3 may include a detachable member lv53 located corresponding to a shoulder part of the user.

The detachable members rv63 and lv63 may be detachable members of the type B, and detachable member rv53 and lv53 may be detachable members of the type A.

The tactile stimulation providing apparatus 23 is well adhered closely to a waist of the user due to the wing bands rwb3 and lwb3, but may not well adhered closely to the shoulder parts and a chest part of the user. However, when the positions of the wing bands rwb3 and lwb3 are simply changed to the chest part or when the widths of the wing bands rwb3 and lwb3 are widened, the user may have difficulty in Inserting arms of the user. Thus, the tactile stimulation providing apparatus 23' uses the protrusion parts brs3 and bls3 located corresponding to the shoulder parts of the user and the detachable members rv53, rv63, lv53, and lv63, so that the tactile stimulation providing apparatus 23' can be well adhered closely to the shoulder parts and the chest part of the user.

Figure 33:
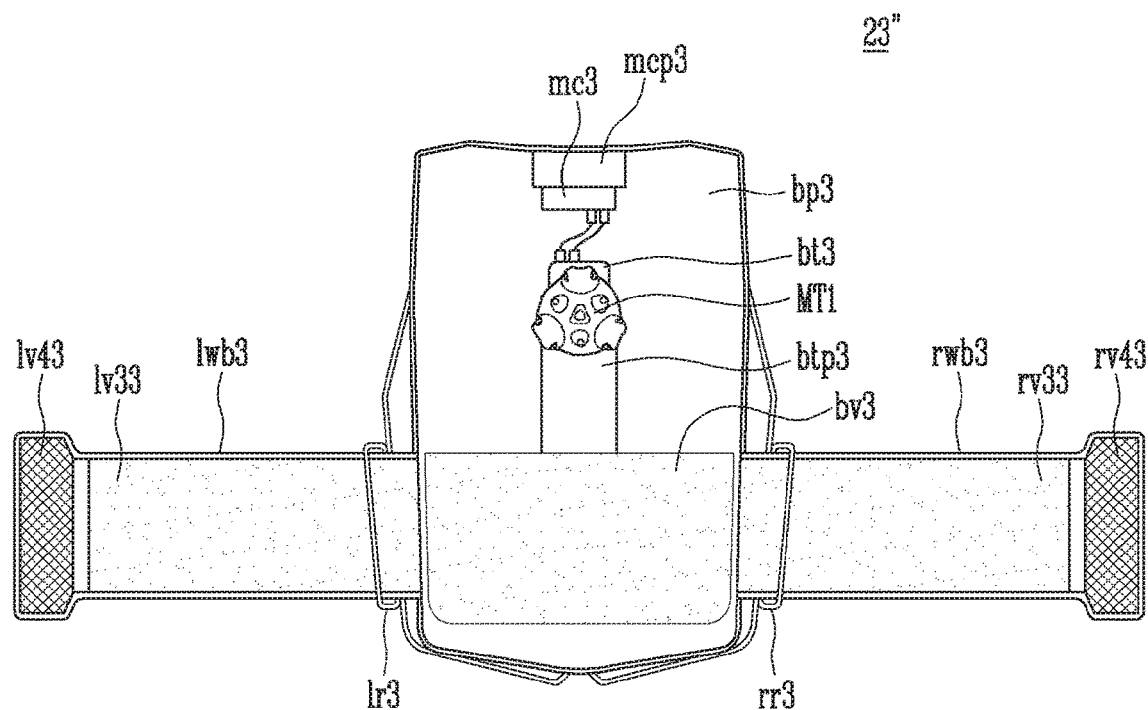
FIGS. 33 and 34 are views illustrating another modification of the tactile stimulation providing apparatus shown in FIG. 27.
Figure 34:
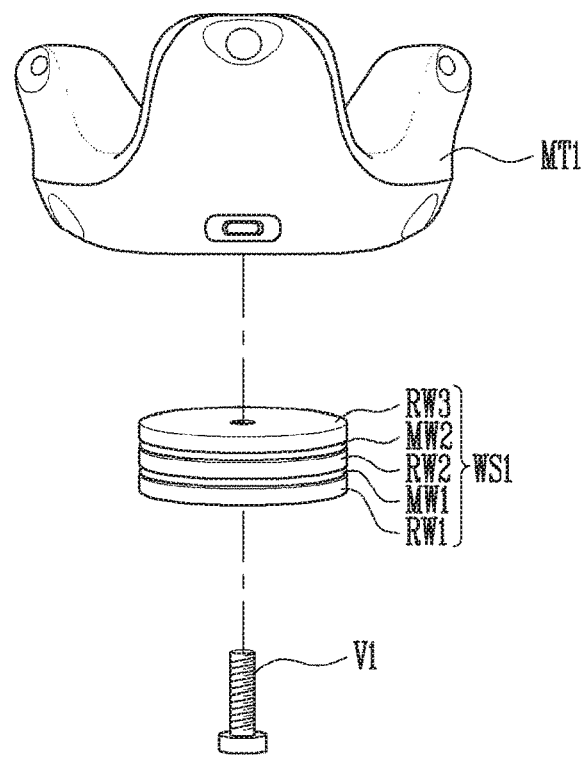

FIGS. 33 and 34 are views illustrating another modification of the tactile stimulation providing apparatus shown in FIG. 27.

Referring to FIGS. 33 and 34, the tactile stimulation providing apparatus 23" may further include a motion tracker MT1.

The motion tracker MT1 may be a device capable of checking a position on a three-dimensional space of the motion tracker MT1 by receiving an infrared signal radiated from an external base station. In another embodiment, the motion tracker MT1 may be designed to calculate an amount changed based on an initially set specific absolute value by having an acceleration sensor, a gyro sensor, or the like, which is built therein. A user may use its own motion as an input means by moving the motion tracker MT1.

A washer assembly WS1 may include rubber washers RW1, RW2, and RW3 and at least one metal washer MW1 and MW2 located between the rubber washers RW1, RW2, and RW3. In the embodiment shown in FIG. 34, a rubber washer RW1, a metal washer MW1, a rubber washer RW2, a metal washer MW2, and a rubber washer RW3 are sequentially stacked to constitute the washer assembly WS1, but those skilled in the art may vary a number of components. The rubber washers RW1, RW2, and RW3 provide an elastic force and a supporting force, and the metal washers MW1 and MW2 can prevent occurrence of an excessive frictional force between the rubber washers RW1, RW2, and RW3.

The user may allow the motion tracker MT1 fitted around a bolt V1 and then rotate the motion tracker MT1 in the direction (lower direction) of the washer assembly WS1. Although the motion tracker MT1 is in contact with the washer assembly WS1, the user may further rotate the motion tracker MT1 until the motion tracker MT1 forms a desired angle due to the elastic force of the rubber washers RW1, RW2, and RW3. The user rotates only the motion tracker MT1, so that the motion tracker MT1 can firmly fixed to a desired part at a desired angle. For example, in FIG. 33, the motion tracker MT1 is fixed at the battery bt3. However, in another embodiment, the motion tracker MT1 may be fixed to the controller case mc3.

Although the washer assembly WS1 is provided in the embodiment shown in FIG. 34, a single rubber washer optimized through elastic modulus and thickness adjustment may be provided. Therefore, the metal washer may be unnecessary.

Although the present invention has been described with reference to exemplary embodiments illustrated in the drawings for illustrative purposes, those skilled in the art will appreciate that various modifications and equivalent embodiments are possible, without departing from the scope and spirit of the invention. Accordingly, the substantial technical protection scope of the present invention will be defined by the appended claims.

The invention claimed is:

1. A tactile stimulation providing apparatus in a form of a vest, the tactile stimulation providing apparatus comprising:
a first front panel including a plurality of actuators arranged between a first side and a second side thereof;
a second front panel including a plurality of actuators arranged between a first side and a second side thereof, wherein the first side of the second front panel is fastenable to the second side of the first front panel;
a fastening member fastening the second side of the first front panel and the first side of the second front panel;
a rear panel including a plurality of actuators arranged between a first side and a second side thereof;
a first wing band;
a second wing band;
a first detachable wing band member located at a first end and a front surface of the first wing band;
a second detachable wing band member located on a front surface of the first front panel and on the front surface of the first wing band, the second detachable wing band member being detachable from the first detachable wing band member;
a third detachable wing band member located at a first end and a front surface of the second wing band;
a fourth detachable wing band member located on a front surface of the second front panel and on the front surface of the second wing band, the fourth detachable wing band member being detachable from the third detachable wing band member;
a fifth detachable wing band member located at the first end of a rear surface of the first wing band, the fifth detachable wing band member being detachable from the second detachable wing band member;
a sixth detachable wing band member located at the first end of a rear surface of the second wing band, the sixth detachable wing band member being detachable from the fourth detachable wing band member;
a seventh detachable wing band member located between the fifth detachable wing band member and a second end of the rear surface of the first wing band, the seventh detachable wing band member being detachable from the second detachable wing band member; and
an eighth detachable wing band member located between the sixth detachable wing band member and a second end of the rear surface of the second wing band, the eighth detachable wing band member being detachable from the fourth detachable wing band member, wherein each of a vertical width of the first end of the first wing band, a vertical width of the first detachable wing band member, and a vertical width of the fifth detachable wing band member is greater than that of an inner circumference of a first ring, wherein each of a vertical width of the first end of the second wing band, a vertical width of the third detachable wing band member, and a vertical width of the sixth detachable wing band member is greater than that of an inner circumference of a second ring, wherein each of a vertical width of the second detachable wing band member and a vertical width of the seventh detachable wing band member is less than that of the inner circumference of the first ring, wherein each of a vertical width of the fourth detachable wing band member and a vertical width of the eighth detachable wing band member is less than that of the inner circumference of the second ring, wherein the first side of the rear panel is fastenable to the first side of the first front panel through the first wing band that a) is connected to the first side of the first front panel, b) loops through the first ring connected to the first side of the rear panel and thereby folds over the first ring, c) thereafter is rolled at the first end of the first wing band to reduce a length of the first wing band by attaching the first detachable wing band member and the fifth detachable wing band member to the second detachable wing band member sequentially, and d) thereafter attaches at the front surface between the first side and the second side of the first front panel without crossing the fastening member by attaching the seventh detachable wing band member to the second detachable wing band member, and wherein the second side of the rear panel is fastenable to the second side of the second front panel through the second wing band that a) is connected to the second side of the second front panel, b) loops through the second ring connected to the second side of the rear panel and thereby folds over the second ring, c) thereafter is rolled at the first end of the second wing band to reduce a length of the second wing band by attaching the third detachable wing band member and the sixth detachable wing band member to the fourth detachable wing band member sequentially, and d) thereafter attaches at the front surface between the first side and the second side of the second front panel without crossing the fastening member by attaching the eighth detachable wing band member to the fourth detachable wing band member.

2. A tactile stimulation providing apparatus in a form of a vest, the tactile stimulation providing apparatus comprising:
   a first front panel including a plurality of actuators arranged between a first side and a second side thereof;
   a second front panel including a plurality of actuators arranged between a first side and a second side thereof, wherein the first side of the second front panel is fastenable to the second side of the first front panel;
   a rear panel including a plurality of actuators arranged between a first side and a second side thereof;
   a first wing band including a first detachable wing band member located at a first end of a rear surface of the first wing band and a second detachable wing band member located between the first detachable wing band member and a second end of the first wing band; and
   a second wing band including a third detachable wing band member located on a front surface of the second wing band, a fourth detachable wing band member located at a first end of a rear surface of the second wing band, and a fifth detachable wing band member located between the fourth detachable wing band member and a second end of the second wing band, wherein the rear panel includes a sixth detachable wing band member located on a rear surface of the rear panel, wherein the fourth detachable wing band member is detachable from the sixth detachable wing band member, wherein the first detachable wing band member is detachable from the third detachable wing band member, wherein the second side of the rear panel is fastenable to the second side of the second front panel through the second wing band that a) is connected to the second side of the rear panel, b) loops through a second ring connected to the second side of the second front panel and c) attaches to the rear surface between the first side and the second side of the rear panel by attaching the fourth detachable wing band member to the sixth detachable wing band member, wherein the first side of the rear panel is fastenable to the first side of the first front panel through the first wing band that a) is connected to the first side of the rear panel, b) loops through a first ring connected to the first side of the first front panel, c) attaches to the second wing band by attaching the first detachable wing band member to the third detachable wing band member, and d) exposes a front surface of the first wing band, which does not include any detachable wing band member, wherein the rear surface of the rear panel, an attached portion of the first wing band, and an attached portion of the second wing band are sequentially overlapped, wherein a vertically-extending width of the first end of the first wing band having the first detachable wing band member thereon is greater than a narrower section of the first wing band adjacent the first end and is greater than a vertically-extending width of an inner circumference of the first ring so that the first end of the first wing band is caught by the first ring when a user removes the tactile stimulation providing apparatus, wherein the first detachable wing band member extends across the vertically-extending width of the first end of the first wing band and extends farther than a length of the narrower section of the first wing band, and wherein a vertically-extending width of the first end of the second wing band having the fourth detachable wing band member thereon is greater than a narrower section of the second wing band adjacent the first end and is greater than a vertically-extending width of an inner circumference of the second ring so that the first end of the second wing band is caught by the second ring when the user removes the tactile stimulation providing apparatus, wherein the fourth detachable wing band member extends across the vertically-extending width of the first end of the second wing band and extends farther than a length of the narrower section of the second wing band.

* * * * *